US011206185B2

United States Patent
Sarood et al.

(10) Patent No.: US 11,206,185 B2
(45) Date of Patent: Dec. 21, 2021

(54) RULES DRIVEN SOFTWARE DEPLOYMENT AGENT

(71) Applicant: Juniper Networks, Inc., Sunnyvale, CA (US)

(72) Inventors: Osman Sarood, San Jose, CA (US); Randall Wayne Frei, Los Altos, CA (US); Robert J. Friday, Los Gatos, CA (US); Keh-Ming Luoh, Fremont, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 60 days.

(21) Appl. No.: 16/728,464

(22) Filed: Dec. 27, 2019

(65) Prior Publication Data

US 2020/0403855 A1 Dec. 24, 2020

Related U.S. Application Data

(60) Provisional application No. 62/865,251, filed on Jun. 23, 2019.

(51) Int. Cl.
*H04L 12/24* (2006.01)
*G06F 8/65* (2018.01)
(Continued)

(52) U.S. Cl.
CPC ............ *H04L 41/082* (2013.01); *G06F 8/65* (2013.01); *H04L 43/0817* (2013.01); *H04L 43/12* (2013.01); *H04L 63/02* (2013.01)

(58) Field of Classification Search
CPC ... H04L 41/082; H04L 43/0817; H04L 43/12; H04L 63/02; H04L 41/044; H04L 41/28;
(Continued)

(56) References Cited

U.S. PATENT DOCUMENTS 9,311,066 B1   4/2016   Garman et al.
10,289,403 B1   5/2019   Krishnaswamy et al.
(Continued)

FOREIGN PATENT DOCUMENTS

JP   2021002325   1/2021

OTHER PUBLICATIONS

"Australian Application Serial No. 2020201178, First Examination Report dated Sep. 2, 2020", 6 pgs.
(Continued)

*Primary Examiner* — Moustafa M Meky
*Assistant Examiner* — Elizabeth Kassa
(74) *Attorney, Agent, or Firm* — Shumaker & Sieffert, P.A.

(57) ABSTRACT

The disclosed embodiments provide for rules-based deployment of software installations. In some aspects, operational parameters for a computer system are monitored over time to generate a historical database of values for the operational parameters. The computer system may include multiple instances of a software installation. A portion of the multiple instances is updated with a new version of software. The operational parameters are then monitored to quantify whether the new version results in an improvement or degradation of performance of the computer system. The improvement or degradation is based on comparing values of the operational parameters after deployment to their historical values. Depending on the evaluation of the operational parameters after the installation, the installation may be rolled back if a degradation is indicated. Otherwise, the new software version may be propagated to additional installation instances.

21 Claims, 12 Drawing Sheets

(51) Int. Cl.
  *H04L 12/26* (2006.01)
  *H04L 29/06* (2006.01)
(58) Field of Classification Search
  CPC ............... H04L 41/046; H04L 41/0893; H04L 41/0863; H04L 67/34; G06F 8/65; G06F 11/1433; G06F 11/3055; G06F 11/3495; G06F 11/3409; G06F 11/302
  USPC .......................................................... 709/223
  See application file for complete search history.

(56) References Cited

U.S. PATENT DOCUMENTS

| | | | |
|---|---|---|---|
| 2003/0172145 A1* | 9/2003 | Nguyen | H04L 12/1403 709/223 |
| 2008/0281956 A1 | 11/2008 | Madej | |
| 2008/0301765 A1* | 12/2008 | Nicol | H04L 63/20 726/1 |
| 2014/0143400 A1 | 5/2014 | Sutherland et al. | |
| 2014/0244799 A1 | 8/2014 | Kundgol et al. | |
| 2016/0055077 A1* | 2/2016 | Baloch | G06F 11/3692 714/38.1 |
| 2016/0164957 A1* | 6/2016 | Leemet | G06Q 30/04 709/203 |
| 2017/0031671 A1 | 2/2017 | Joshi et al. | |
| 2017/0344703 A1 | 11/2017 | Ansari et al. | |
| 2019/0034194 A1 | 1/2019 | Fox | |
| 2019/0044999 A1* | 2/2019 | Jung | G06F 8/60 |
| 2019/0138295 A1 | 5/2019 | Agerstam et al. | |

OTHER PUBLICATIONS

"European Application Serial No. 20165756.6, Extended European Search Report dated Aug. 28, 2020", 11 pgs.

"Australian Application Serial No. 2020201178, Response filed Dec. 10, 2020 to First Examination Report dated Sep. 2, 2020", 23 pgs.

"Australian Application Serial No. 2020201178, Subsequent Examiners Report dated Dec. 23, 2020", 5 pgs.

Response to the Extended European Search Report dated Aug. 28, 2020 in counterpart European Application Serial No. 20165756.6, filed Jun. 29, 2021, 22 pp.

* cited by examiner

RULES DRIVEN SOFTWARE DEPLOYMENT AGENT

CROSS REFERENCE TO RELATED APPLICATIONS

This application claims priority to U.S. Provisional Application No. 62/865,251, filed Jun. 23, 2019 and entitled "Rules Engine for Software Propagation." The contents of this prior application are considered part of this application, and are hereby incorporated by reference in their entirety.

FIELD

The present application relates to improving operations of a wireless system and specifically improving security, serviceability, and capacity of a wireless network in a hybrid cloud deployment topology.

BACKGROUND

Wireless networks such as Wi-Fi networks can be deployed on customer premises on a dedicated server or a private cloud. Another typical deployment utilizes a cloud-based implementation that provides management functions for a customer's on-premises Wi-Fi network.

When a customer's infrastructure is used for management of their Wi-Fi network, data traversing the customer's wireless network does not leave the customer's premises. This topology does not benefit from some information that could improve the operations of the network. For example, information derived from behavior of other similar Wi-Fi networks is not shared with this Wi-Fi network. This deployment topology may also experience less efficient issue resolution resulting from a lack of vendor visibility into the operations of the Wi-Fi network. When this topology is used, updates to software and/or firmware running on network components of the Wi-Fi network, a dedicated technician may need to be dispatched to the customer's site to service the Wi-Fi network. The lack of central management in this topology thus increases operational cost.

A cloud-based implementation that manages and receives data from multiple customer Wi-Fi networks has the advantage of being able to utilize data, including system level experience (SLE) data, from multiple customers to optimize the operations of each one of the networks managed by the cloud implementation.

DETAILED DESCRIPTION

Figure 1:
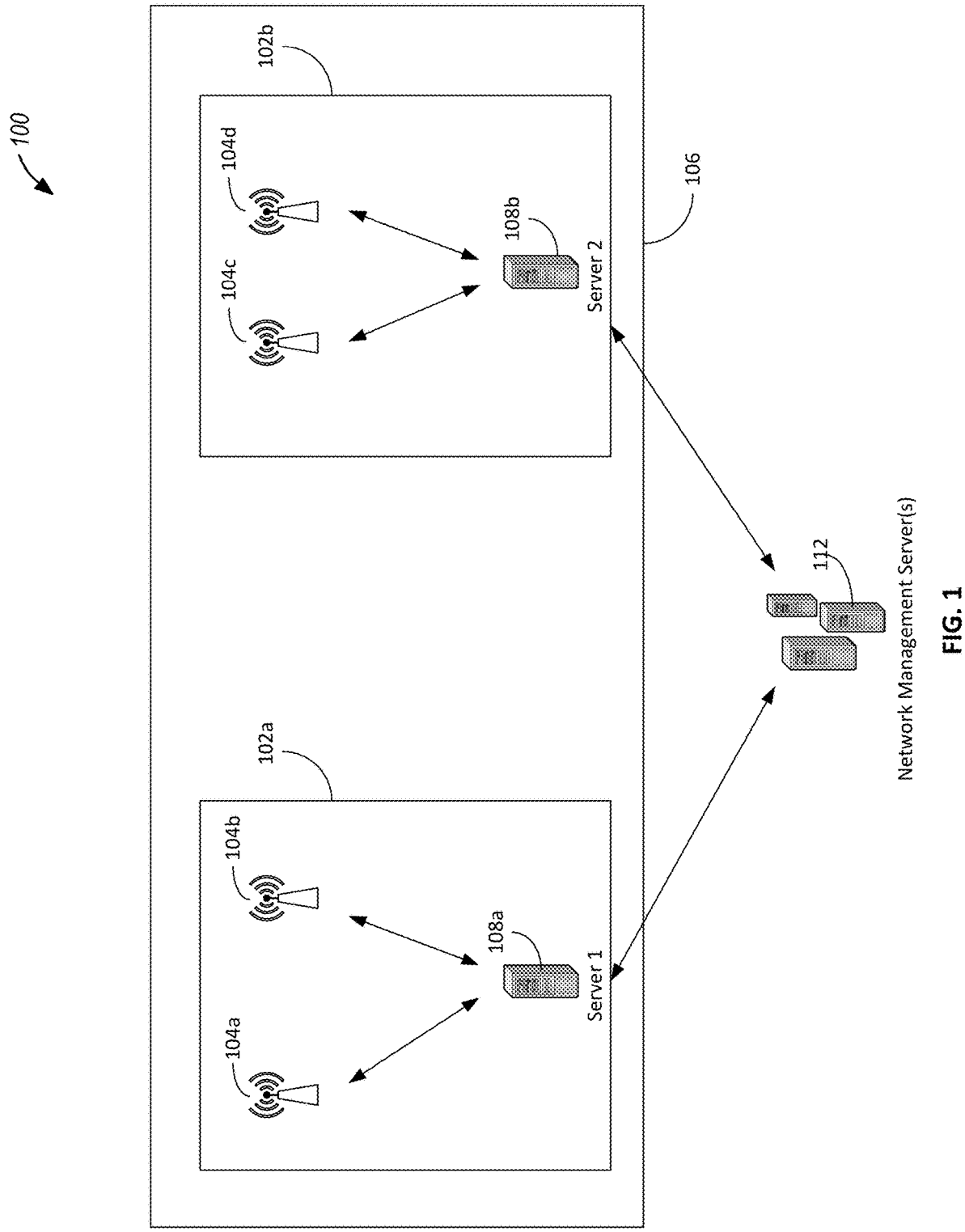
FIG. 1 shows an example two example deployments within one or more of the disclosed embodiments.

As described above, use of a centralized network management system to manage customer Wi-Fi implementations provides several benefits for both customers and vendors. For example, a vendor accumulates substantial knowledge relating to best practices of Wi-Fi management, and can apply these lessons learned via their central network management system to improve the customer's Wi-Fi experience. Furthermore, the vendor is able to directly manage upgrades of software and/or firmware of network components running within the customer's Wi-Fi network. Thus, customers may benefit from a reduced lag between a new software or firmware release being publicly available, and its implementation within their Wi-Fi network. However, some customers are resistant to providing a vendor with access to their Wi-Fi network. For example, many customer networks communicate sensitive data, a compromise of which represents a substantial business risk to the customer. To mitigate this risk, it is not uncommon for customers to maintain access controls on their network that prevent many types of access to their Wi-Fi network by a vendor. In one example, access is restricted to prevent the monitoring of system level experience (SLE) parameters that describe performance of the network from multiple dimensions. The lack of access to this type of information by the vendor can inhibit the vendor from being able to make appropriate decisions with respect to how best to manage the customer's Wi-Fi network. For example, if the vendor does not have access to parameters such as jitter or packet loss statistics in particular regions of the Wi-Fi network, how best to tune receivers and/or transmitters of the network cannot necessarily be adequately determined by the vendor.

What is needed is a secure system that provides an ability to centrally manage a customer's Wi-Fi network(s), without compromising the security of said network(s). The disclosed embodiments provide for an improved ability to monitor a customer's Wi-Fi network by a vendor while satisfying the customer's concerns about data privacy. In particular, the disclosed embodiments provide for deployment of a network management agent within a customer's network. The network management agent provides for management of network devices, such as access points, in the customer's network. In some embodiments, the network management agent downloads software/firmware updates for software/firmware that is running on network devices within the customer's network. The downloads are accomplished via communication with an Internet based service, typically provided by a vendor of the network devices. The network management agent also electronically receives, from the vendor, rules defining how deployment of a software/firmware update is governed and/or managed. The agent evaluates the rules provided by the vendor within the customer's network. The rules may reference one or more operational parameters of the customer network. Furthermore, the rules may reference data within the customer's network that the customer does not want to expose outside of the customer's environment. Since the network management agent is running within the customer's environment, the network management agent has visibility into the customer's network environment that would otherwise by unavailable to devices outside the customer's environment. Thus, the network agent is able to evaluate rules specified by the vendor that could not be evaluated outside the customer's environment. Furthermore, by having the network agent evaluate the rules within the customer environment, the privacy of customer data that is necessary to perform the evaluation is protected from disclosure to the vendor. Risk of any other disclosure of this information is also minimized, since the customer data does not leave the customer environment. The agent provides status information, in at least some embodiments, to the vendor on the software/firmware deployment process. This status information is provided to the vendor without revealing details of any customer private data that would represent a security risk to the customer. For example, specific values of operational parameter values, evaluated to determine whether particular software deployment rules are satisfied, are not included in status updates to entities outside the customer environment. Instead, high level status indications are provided that do not reveal sensitive customer data (such as user names or specific network performance parameters).

At least some of the disclosed embodiments classify data related to the Wi-Fi network. For example the data is classified, in some embodiments, into categories such as user data (e.g., data send to and from users), wireless terminal data (e.g., location of terminals, mobility of terminals, etc.), IP addresses in the customer's network, operational data (RSSI, capacity, throughput, etc.), version of application software on different devices (e.g., version of software running on each AP, etc.), software status data (e.g., status of various software modules, etc.), HW status (e.g., CPU utilization, memory utilization, server temperature, etc.).

Exposing information such as user data, internal network IP addresses, etc. to the vendor or otherwise outside the customer's environment may present security risks. However presenting information such as the HW status, the temperature of a specific server on the customer's Wi-Fi network, CPU utilization, memory utilization, network utilization, etc., presents minimal, if any, security risk.

Some of the disclosed embodiments tag data that flows through a customer's network and categorizes it accordingly. For example, data can be categorized as sensitive or not sensitive. Sensitive information is tagged accordingly and corralled within the customer's premise. Similarly, information that presents lower or no risk is shared with the vendor's cloud and is utilized to improve the operations of the customer's Wi-Fi network, as it will be explained in greater details below.

FIG. 1 shows an example two example deployments 102a-b within one or more of the disclosed embodiments. Each of the deployments 102a-b is configured to directly control one or more access points (104a-b, and 104c-d respectively) physically located within a customer's on-premise network 106. As explained above, in some solutions, if a network component manufacturer or vendor directly manages the customer's Wi-Fi network, the vendor may gain access to data sets tagged as highly confidential by some customers. This may not be desirable.

Referring back to FIG. 1, the configuration shown by the deployments 102a-b may be chosen by customers who, due to security concerns, seek to prevent the vendor from having direct access to and control of their network. These customers chose to deploy the configuration shown in FIG. 1, which relies on computing resources installed in a secured data center that is controlled by the customer.

In the deployment configuration of FIG. 1, the manufacture or vendor of the deployments 102a-b has restricted access to the hardware resources (and access via authentication) on which the deployments 102a-b rely, e.g., server 1 (108a) and server 2 (108b). In the illustrated configuration, the vendor does not have access to the APs 104a-d or to any other server or applications on the customer's on premises network 106. In accordance with yet another embodiment the vendor may have limited access to the applications running on the server(s) 108a-b within the customer's data center. This access may be facilitated using a cryptographic network protocol for operating network services securely over an unsecured network such as e.g., SSH, or any other remote command-line login and remote command execution program. For example, hardware information from a hardware status collector such as the Data Collection Software from Diamond Technologies can be sent to a network management system 112 via an agent running on server(s) 108a-b or alternatively accessed via SSH services.

In some of the disclosed embodiments, the only connection between the secured customer's network (e.g., the server(s) 108a-b) and the outside world is via a single secured connection between a network management system 112 (in the vendor's cloud, not shown) and an agent deployed on a server 108a-b in the secured data center of the customer. The connection between the network management system 112 in the vendor's cloud and the agent on customer premises is a single secured data connection which makes it easy to monitor and control all data flow over this connection.

The disclosed embodiments provide multiple modes of operation. A first mode of operations is the mode wherein the vendor has a new software version that needs to be deployed on devices on customer premises. This mode of operations is described in greater details as part of the software distribution embodiments described below.

Another mode of operations relates to monitoring status of the Wi-Fi network. In these embodiments, an agent executing on one or more of the servers 108a-b collects information that can assist a manufacturer gain visibility into the customer's network without compromising sensitive information about the network or about the users of the network. A few exemplary types of information that the agent collects and conveys to the vendor's network management system 112 include telemetry, connectivity, or events.

Telemetry information may include status data that is collected by a software module on each server 108a-b. For example, the status engine may collect hardware and/or software status information from one or more network components being managed and convey the information to the network management system 112. This information includes but is not limited to CPU utilization, memory utilization, and/or temperature. In some embodiments, the telemetry information is collected continuously and sent periodically to the network management system 112. Alternatively, the information may be compared against predetermined thresholds and sent to the network management system 112 only if the data crosses a predetermined threshold.

Connectivity events are messages by which an agent which lost connectivity to the network management system 112 notifies the network management system 112 as soon as it is able to re-establish communication with the network management system 112.

Event data related to notifying the network management system 112 when an unexpected event takes place on a server running the agent. An example of an unexpected event may result from an IT technician of the customer disabling (or stopping) a service running on either of the servers 108a-b. In such event takes place, the agent (not shown) notifies, in some embodiments, the network management system 112 of such event and may prompt the vendor to contact the customer to understand a current configuration of one or more of the deployments 102a-b within the customer's data center.

The agent may be configured to communicate with a single device of the network management system 112, and thus a firewall or other access device for the customer's network is then configured to only open a single access point, thus reducing security risk. By directing all traffic through a single communication channel the customer is able to more easily monitor the communication link and prevent any communication data packet which includes information/data other than data that was marked as generic low security risk data.

Secured data such as IP addresses of equipment on customer premises, data exchanged between devices, location of WTs on premise, as well as any other data marked as sensitive information never leaves the customer's data center.

The topology also limits the data that the network management system 112 is permitted to send to the system 102a-b in the customer's data center. Specifically, the data is limited to downloading a new software version and the associated deployment rule file. This operation is explained in greater details in the second section below.

A development process may include a check in process that submits software code to a database repository. An automated software build process may occur based on the checked in software code. Some embodiments may utilize a tool called Jenkins. Jenkins is an open source automation server that automates the non-human part of the software development process, with continuous integration and facilitating technical aspects of continuous delivery. A new software version usually contains bug fixes, new features, enhancement for existing features, test code, etc. The new software changes are incorporated into the build process that takes place on the application build server that resides in the cloud. Once a new image of the application is created, the image is uploaded into a storage server, e.g., into an Amazon S3 storage cloud or alternatively into storage in the cloud.

In some cases, a deployment engineer determines a schedule and rules for the deployment and submits the schedule and rules into the system. Without limitations, the following are examples of rules that the deployment engineer may utilize: deploy new software version at a specific time, deploy new software version only on specific APs, use new software version for controlling only a specific sub-segment of Wi-Fi network, update only a specific software module on a specific server, etc. As explained below with greater details, the system accommodates also a conditional progressive deployment rule set.

The rules and new software version are stored in a local queue/storage facility or on a cloud based storage such as S3. An Apache Kafka® environment may be used to stream the software and/or the rule file to a target server. The storage facility environment stores streams of records such as the new software version in a fault-tolerant durable means. In accordance with one preferred embodiment the new software version is uploaded (streamed) to cloud storage such as the Amazon S3 storage. However the specific storage facility (on premise, cloud based, hybrid on premise and cloud based, etc.) is not essential to the operations of our disclosed embodiments, which can operate with any storage facility.

The network management system 112, in some embodiments, stores multiple different software versions for selective deployment across a variety of customer environments. Thus, while FIG. 1 is discussed with respect to two deployments at a single customer, the network management system 112 is designed to support an unlimited number of different customers, with each customer maintaining their own deployment rule sets and software version libraries. This provides the flexibility to meet a wide variety of customer requirements in different environments, such as different hardware versions, different operational environment, e.g., exposure to weather radars and military communication channel on the same frequency band used by the Wi-Fi network, etc.

Deployment rules are conveyed to an agent running on one or more of the servers 108a-b by the network management system 112. If the rule is a simple rule, such as deploy new software version to the whole site at a specific time, the network management system 112, in some embodiments, notifies the agent running on one or more of the servers 108a-b that new software is available for deployment. Additionally, the notification can indicate a location where the file is stored within the network management system 112 and the name of the file. Upon receiving this message, in some embodiments, the agent accesses a storage area within the network management system 112. For security reasons, some embodiments enforce access to a new software version to flow through the network management system 112. In these embodiments, the agent generally will not access internet-based storage directly, such as S3 storage. In some embodiments, the software/firmware resides on S3 storage, in a Kafka fault-tolerant storage, or on any other storage. Cloud based storage provides some advantages with respect to dynamic adaptation of bandwidth, download capacity, which may be necessary in some embodiments to handle peak customer demand for updated software (e.g. such as shortly after a new software or firmware version is released).

Figure 2:
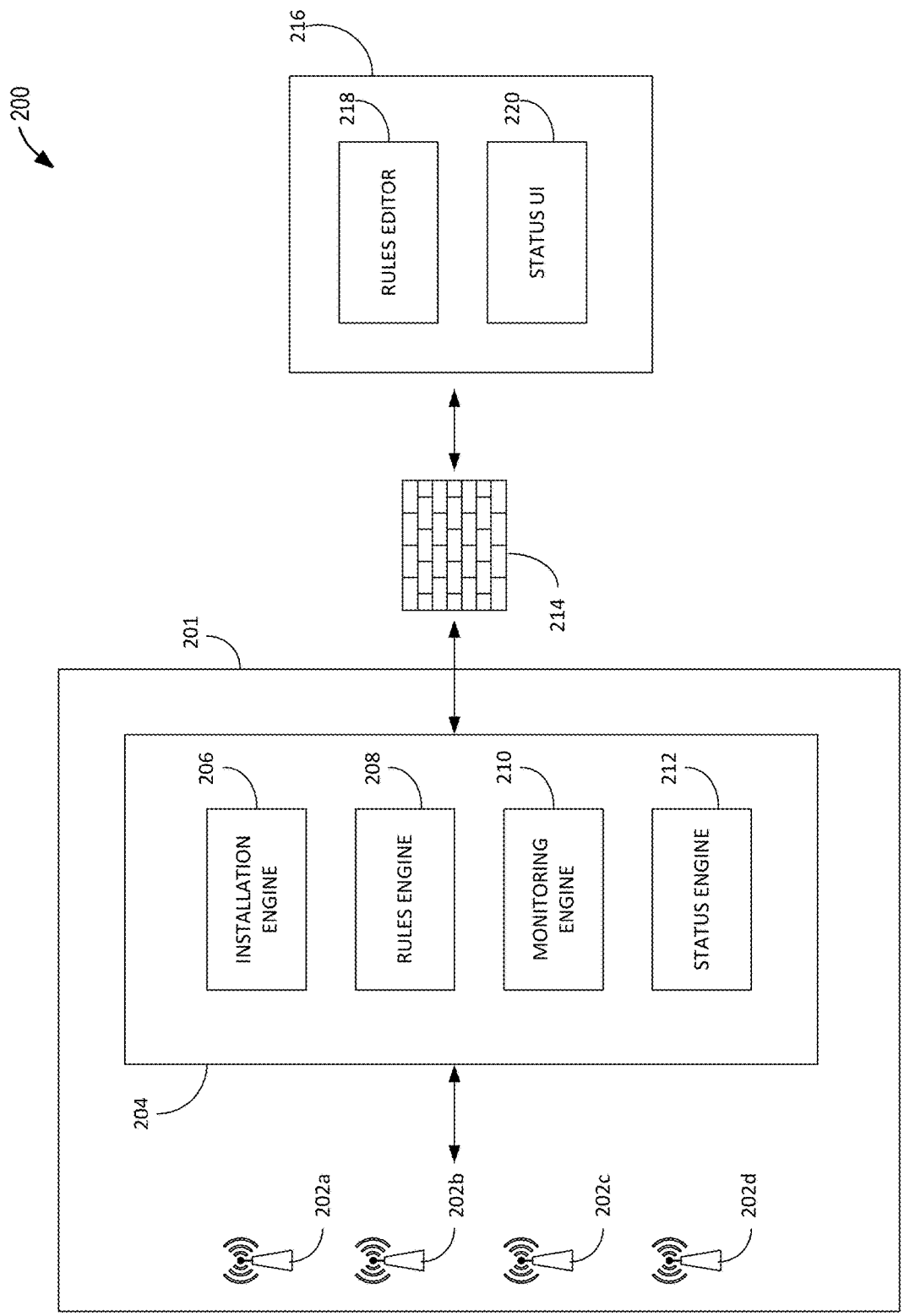
FIG. 2 is an overview diagram showing of components of at least some of the disclosed embodiments.

FIG. 2 is an overview diagram showing components 200 of at least some of the disclosed embodiments. FIG. 2 shows an enterprise network 201. Within the enterprise network 201 is a plurality of network components 202a-d, in this case illustrated as wireless access points. The wireless access points are in communication with an agent module 204. The agent module 204 represents instructions that configure hardware processing circuitry, such as one or more hardware processors, to perform functions that are attributed to the agent module throughout this disclosure. The agent module 204 includes an installation engine 206, rules engine 208, monitoring engine 210, and a status engine 212. Each of the installation engine 206, rules engine 208, monitoring engine 210, and status engine 212 represents groups of instructions that configure the hardware processing circuitry to perform functions attributed to each of the respective engines. The agent module 204 executes, in some embodiments, within an enterprise network, which is secured from other networks outside the enterprise via a firewall 214. The firewall 214 is configured to block access to at least the network components 202a-d from outside the enterprise network 201, including a network management module 216. The firewall 214 is configured to provide limited network connectivity between the agent module 204 and network management module 216. For example, in some embodiments, the firewall 214 is configured to provide access to a limited number of network ports of a computer running the agent module 204. The firewall 214 is also configured, in some embodiments, to provide access to the agent 204 via a limited set of protocols. In some embodiments, the firewall 214 is configured to only allow the agent module 204 and/or a computing device executing the agent module 204 to initiate communications with devices outside the enterprise network. For example, the firewall 214 is configured in some embodiments to allow the agent module 204 to communicate via http or other protocol with the network management module 216 and its corresponding IP address but not with any other devices outside the enterprise network 201.

The network management module 216 includes a rules editing module 218 and a status user interface 220. The rules editing module 218 provides a user interface for creating and managing rules that are downloaded to the agent module 204 via the firewall 214. In some embodiments, the rules are fetched by the agent module 204 using the http protocol, which is selectively enabled by the firewall 214 between the agent module 204 and the network management module 216 in at least some embodiments. The rules identify operational parameters within the enterprise network 201 to be monitored by the agent module 204. The rules also identify criterion to apply to the monitored operational parameters, and condition installation or removal of a software installation based on whether the criterion are met.

The status user interface displays status information relating to installation of software within the enterprise network. The status user interface 220 receives, in some embodiments, status information from the status engine 212. For example, the status engine 212 generates, in some embodiments, information identifying network components present within the enterprise network 201, current software versions installed on those network components, and most recent installation status for each of the network components. For example, the most recent installation status for a network component indicates, in some embodiments, a most recent version of software installation attempted, and whether that attempt was successful, or if the installation was rolled back to a previous version after some period of time. Error information relating to a recent installation is also provided in some embodiments. The status UI 220 provides a user interface that conveys status information generated by the status engine 212 to an administrator. In some cases, the status UI 220 aggregates information received from the status engine 212 and presents summary information that improves ease of use of the information relative to the information provided by the status engine 212. In some embodiments, the status UI 220 also aggregated status information across multiple agent modules 204 before presenting the information, via a user interface, to a network administrator.

While FIG. 2 attributes various functions to various modules shown in FIG. 2, this particular organization of functions within each of the modules is not essential to the disclosed subject matter and other embodiments may partition functions in different manners than that described with respect to FIG. 2.

The network management server 112, in at least some embodiments, notifies an agent (running on a computer such as any of the server(s) 108a-b) of the availability of a new downloading rule file (e.g., file location and name of the file). In response, the agent fetches, in some embodiments, the new downloading rule file from the storage (either local storage, Kafka, or cloud storage, such as S3). In accordance with this embodiment the interpretation of the downloading rule file is performed by the agent (of the system 102) rather than by the network management system 112/network management module 216.

Above we discussed a first example of a rule that controls deployment of a new software version on network devices of a customer network. A second example of a new software deployment deploys, via the rules, a new software version to a subset of devices on a customer network. The rules engine 208 is configured to execute such a rule and updates the defined subset of network devices. The rules engine 208 is configured to track multiple different types of software/firmware updates and map the different types of software/firmware updates with a corresponding device type. Furthermore, some updates may update only a portion of software/firmware installed on a particular network device. For example, in some embodiments, select applications running on a network device may be updated, without effecting other applications running on the network device.

A third example for new SW deployment rule file includes a rule for conditional progressive deployment of a new SW version. These embodiments deploy the new software to a subset of software installation instances and monitor the impact of the new SW version. Specifically, the system monitors the behavior of the instance with the new SW deployed and compares operational parameters of the instance to operational parameters of other instances having previous version(s) of the software installed. Alternatively, at least some of the disclosed embodiments may monitor the performance of the instance having the new software installed and compares it to historical performance of the same instance when it used the previous SW version.

Once the historical behavior of the system, and specifically the SLE associated with this behavior, is measured. The system uses this historical SLE and determines thresholds at least a first criterion and a second criterion. The first criterion is defined so as to indicate whether the monitored instance of a software installation is performing in a manner that reflects an overall degradation in performance, for example, relative to performance of previous version of the software installed on the monitored instance. The second criterion is defined to indicate when the monitored instance of a software installation is performing with an acceptable level of performance.

To determine the first and second criterion, average and/or median values of one or more operational parameters may be recorded over a period of time, to develop a historical data set of operational parameter values. The first criterion may be defined to test whether one or more operational parameters are operating within a particular number of variances or standard deviations from their historical averages. Similarly, the second criterion may be defined to determine whether one or more operational parameters are operating within a second particular number of variances or standard deviations from their historical averages. Depending on the operational parameter being monitored, a positive numerical change may indicate either a degradation (e.g. CPU utilization) or an improvement (e.g. throughput). Thus, the rules engine may be configured to define the first and second criterion based on the characteristics of each of the operational parameters measured, such that the first criterion is met when an overall degradation is detected and the second criterion is met when an overall improvement is detected.

Figure 3:
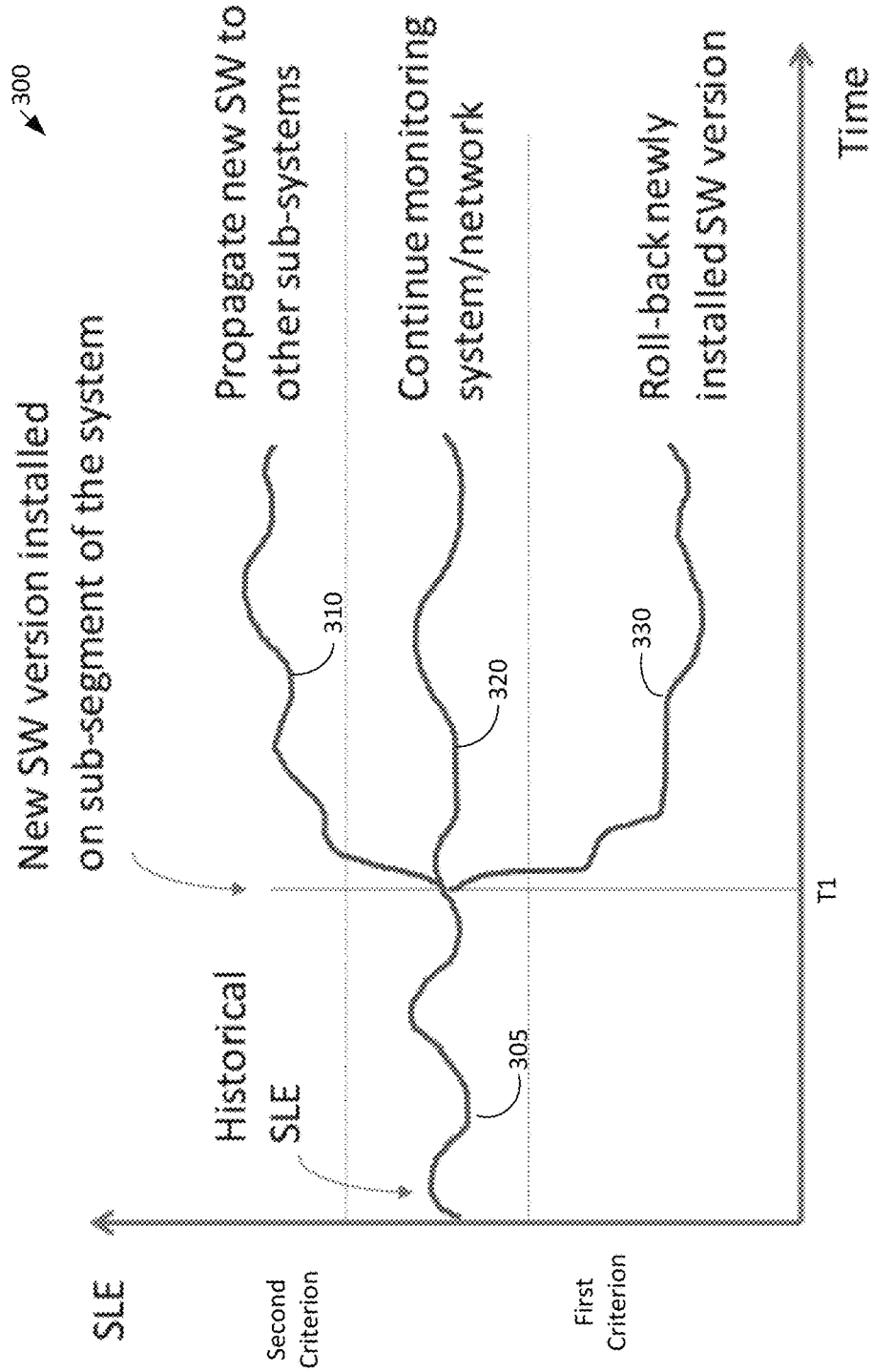
FIG. 3 is a graph showing historical operational parameter values, e.g., SLE, relative to possible changes in those values resulting from installation of new software.

FIG. 3 is a graph showing historical operational parameter values, e.g., SLE, relative to possible changes in those values resulting from installation of new software. FIG. 3 shows a historical average value 305 representing one or more operational parameters. A time T1 indicates a position in the graph where a new software version is installed on a portion of multiple instances (e.g. sub-segment). The graph 300 shows three possible results of the installation at time T1. These results are shown as 310, 320, and 330. Result 310 illustrates a relative improvement in performance compared to performance prior to the installation at T1. Thus, if the disclosed embodiments monitor operational parameters and detect an improvement similar to 310, the disclosed embodiments may determine to further propagate deployment of the new software version to additional instances in a multiple instance environment (e.g. server 1 and server 2 of FIG. 1 illustrate two instances in a multiple instance environment). Result 320 indicates a relatively small or negligible change in operational parameters after installation at time T1. Some of the disclosed embodiments may simply continue monitoring operation parameters when a result analogous or similar to result 320 is experienced. Result 330 illustrates a relative degradation in performance when compared to performance prior to T1 and installation of the new software. Some of the disclosed embodiments may roll back installation of new software on an instance in the event of detecting a degradation such as that illustrated by results 330.

As discussed below, the disclosed embodiments may define one or more first criterion and corresponding first thresholds that test for operational parameter values indicating a degradation of performance (e.g. result 330). The disclosed embodiments may further define one or more second criterion and corresponding second thresholds that test for operational parameter values indicating a relative improvement of performance (e.g. result 310).

Figure 4:
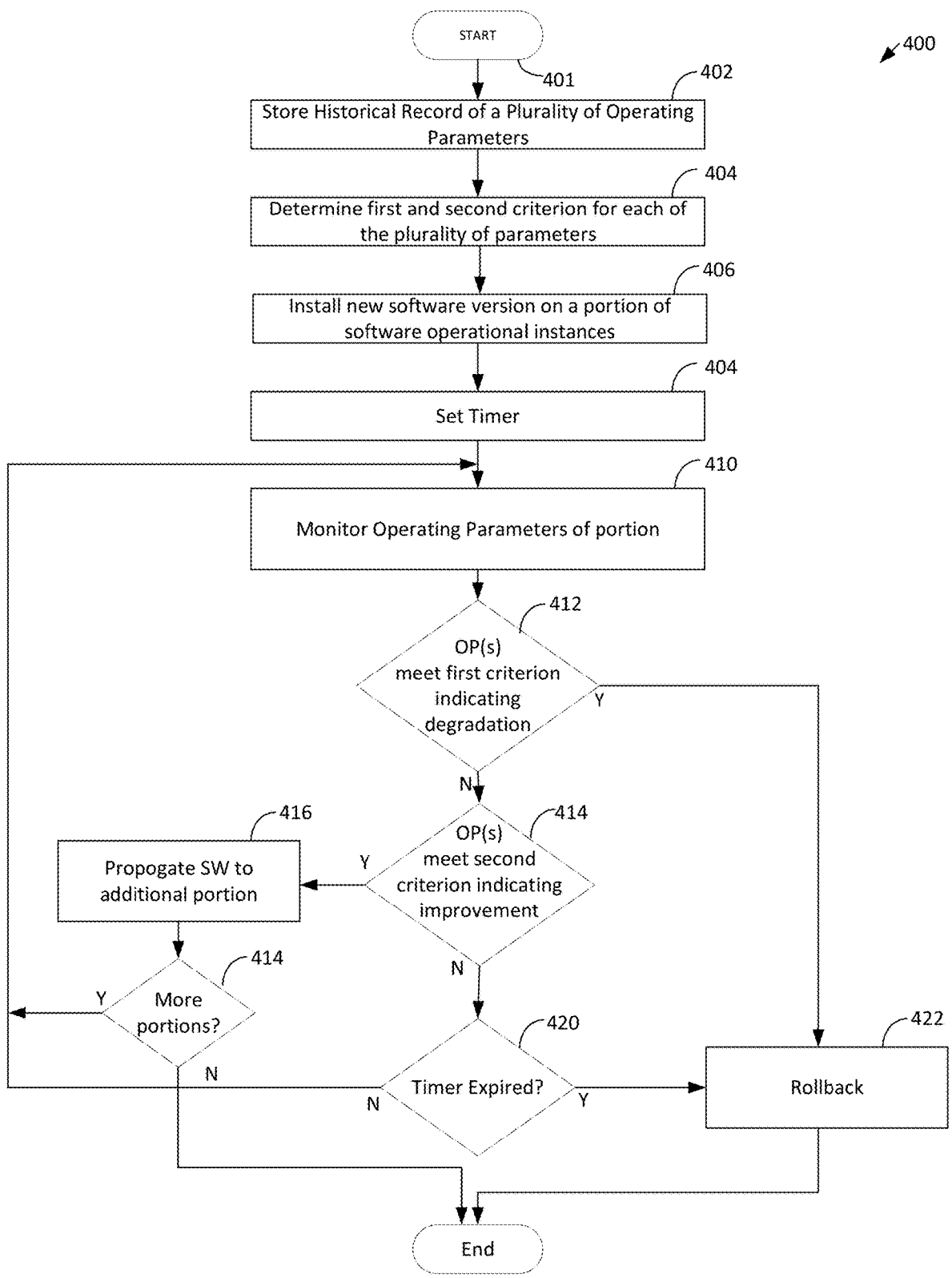
FIG. 4 is a flowchart of an example process that may be implemented in one or more of the disclosed embodiments.
Figure 5:
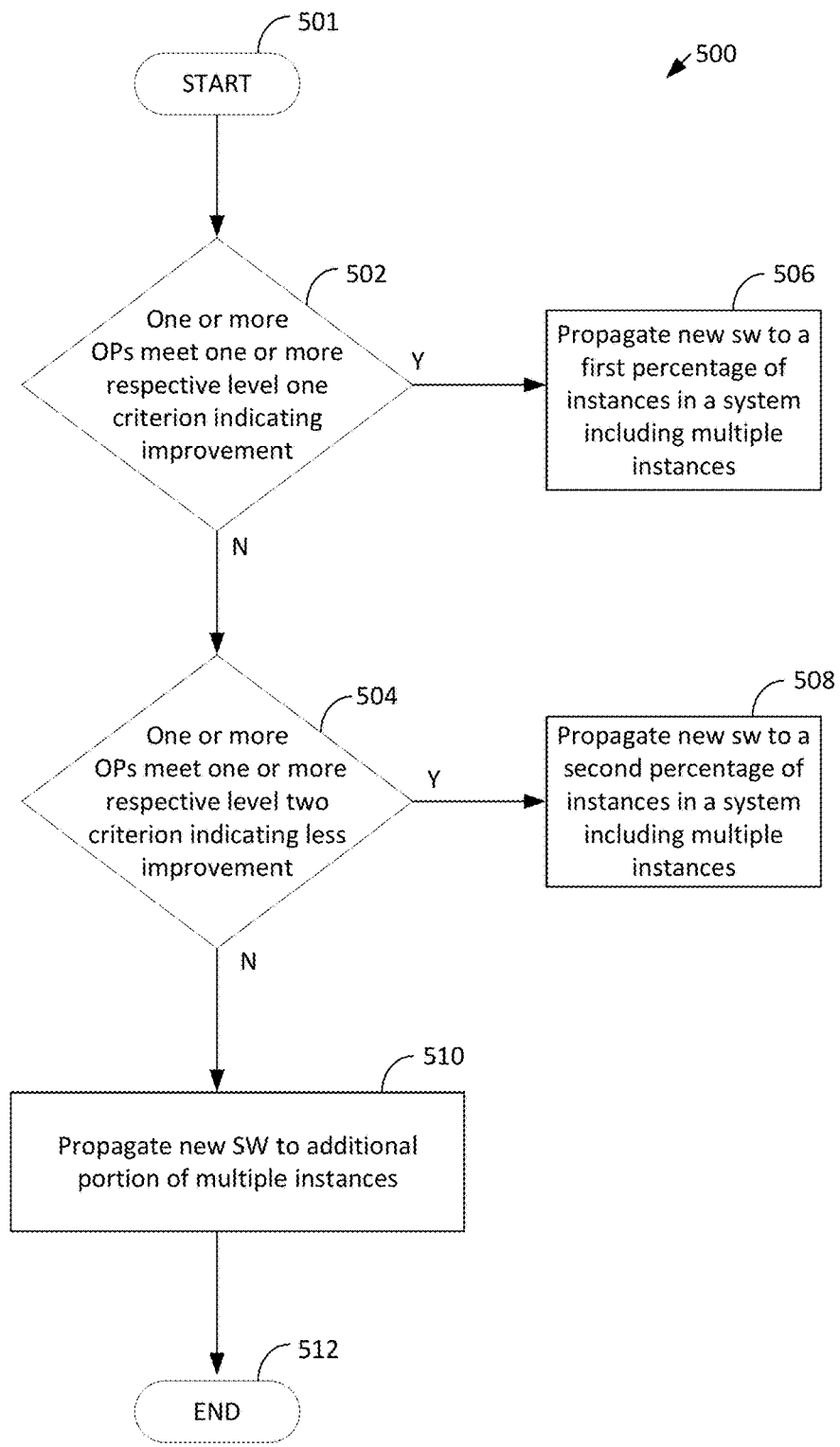
FIG. 5 is a flowchart of a process that may be implemented in one or more of the disclosed embodiments.

Embodiments described below with respect to FIGS. 4 and 5 are generally directed to a rules-based deployment capability. Process 400 of FIG. 4 may be performed by hardware processing circuitry. For example, instructions 1224, discussed below, may be stored in one or more hardware memories (e.g. 1204 and/or 1206 discussed below) and configure hardware processing circuitry (e.g. hardware processor 1202 discussed below) to perform one or more of the functions discussed below with respect to process 400.

The disclosed embodiments provide for conditional progressive deployment of a new software version to a system that includes multiple instances of a particular software installation. For example, the systems 102a-b, discussed above with respect to FIG. 1, may include a first instance of a software installation on a server of the system 102a, and a second instance of the same software installed on a second server of system 102b.

After start operation 401, process 400 moves to operation 402. In operation 402, historical records of a plurality of operating parameters are stored. For example, a system, such as the system 102a and/or 102b, is monitored for values of operational parameters. Operational parameters may include, for example, CPU or other hardware processor utilization, memory utilization, latency, throughput, location accuracy jitter, and other operational parameters which may vary by embodiments.

In operation 404, first and second criterion for one or more of the plurality of operational parameters are determined. In some embodiments, one or more of the first and second criterion relate to absolute limits on operational parameters. For example, one or more of the operational parameters may have defined limits, beyond which operation of a monitored system is conclusively presumed to be compromised. For example, CPU utilization above 95% might be an example of such an absolute limit in some embodiments.

In some embodiments, the first and second criterion are based on the historical records. For example, the first and second criterion may evaluate a deviation from system performance when compared to historical norms. A negative deviation beyond a threshold may indicate that any new software is adversely affecting system performance, and should be rolled back.

Each of the first and second criterion may rely on first and second thresholds respectively. As discussed above, in some embodiments, the first criterion is defined such that when the first criterion is met, a degradation sufficient to cause a roll back of a deployment of a software installation is detected. The one or more first criterion may compare one or more operational parameters of the new software installation to one or more corresponding thresholds. As discussed above, the thresholds may be based on historical performance of previous versions of the software with respect to those operational parameters.

In some aspects, for example, the first threshold may be set at a first number of variances or standard deviations above a mean or median value for an operational parameter. The second threshold may be set to a second number of variances or standard deviations above or below mean or median value for the operational parameters. First and second thresholds may be set for each of the plurality of operational parameters in a similar manner in some embodiments. As discussed above, the disclosed embodiments may define criterion for each of the thresholds. The disclosed embodiments are described with respect to criterion as while thresholds may indicate a particular value of a particular operational parameter, for some operational parameters, being above the threshold is desirable (e.g. throughput), while with other operational parameters, being below a particular threshold value may be desirable (e.g. CPU utilization, connect time, location jitter, etc.). By referring to criterion, the description below avoids this issue, and instead refers simply to particular criterion that are based on or relate to a threshold. The specific thresholds or the method for calculating them are included in the conditional deployment rules in some embodiments.

In operation 406, a new version of software is deployed on a portion of the multiple instances at a time T1. Performance of the new software deployment is then monitored to assess an impact of the new software version. In some aspects, the system monitors a behavior of the instance where the new software is deployed and compares operational parameters, e.g., SLE, of the new software to those of the previous software installation and/or software installation on other portions of the multiple instances.

In particular, in operation 408, a timer is set. The timer may be used to determine an elapsed time that the new software has been installed, with conditional deployment depending on the elapsed time, as described in more detail below.

In operation 410, operating parameters of the portion of the multiple instances are monitored. Monitoring the operational parameters may include collecting or measuring the operational parameters at periodic or elapsed time intervals. Operation 410 may include monitoring operational parameter(s) of a specific sub-segment of a network after installing the new software version.

Decision operation 412 determines whether the monitored operational parameter(s) meet respective first criterion based on their respective first threshold(s). In some aspects, decision operation 412 determines whether a particular operational parameter is greater than its respective first threshold. Thus, process 400 uses historical information regarding an operational parameter (e.g. indicating a system level experience) and determines first and second thresholds as described above. The first threshold may be set to indicate a SLE/performance deterioration that indicates as unsuccessful software upgrade (e.g. new software version provides worst SLE/performance than the old software version). The second threshold may be indicative of a desired system level experience and/or performance improvement based on the new software installation.

If decision operation 412 determines that the monitored operating parameters are not meeting their respective first threshold-based criterion, process 400 moves from decision operation 412 to operation 422, which rolls back the software installation. Operation 422 may uninstall the new software installation and reinstall a previously installed version of the software installation.

If the system detects that the monitored operation parameter(s) are not meeting their first criterion based on the first threshold(s), (the monitored instance does not show degradation in performance) process 400 moves to decision operation 414, which evaluates the operating parameters with respect to a second set of criterion that are each based on the second set of thresholds discussed above. If the monitored operational parameters for the portion are meeting the one or more second criterion that are based on the second threshold(s) respectively (the monitored instance shows improved performance), process 400 moves from decision operation 414 to operation 416, which expands the scope of the software deployment to an additional portion of the multiple instances. If the new software does not show either improvement (second criterion met) nor deterioration (first criterion met) a rule in the new deployment rule file may specify whether to expand the deployment to additional portions of the multiple instances or to continue monitoring the performance of the new software installation for a longer period of time. However, if the portion including the new software version exhibits SLE deterioration indicated by the first criterion, the new software version is rolled back and replaced with the old software version. After propagating the new software version in operation step 416, decision operation 418 checks if there are other portions of the multiple instance deployment (instances) where the new software has not yet been installed. If decision operation 418 determines that there are other instances that do not yet have the new software installed, the process 400 returns to operation 410. Alternatively (not shown), the process may return to operation 408 and reset the timer before attempting to deploy the new SW to additional network segments. If decision operation 418 determines based on a rule file that the new SW version has been propagated to all of the required devices, the process ends.

Going back to operations 412 and 414, if the operations determine that the new SW version did not cause substantial or significant operational parameter deterioration nor result in substantial or significant operational parameter improvement of the system, operations continue to decision operation 420 which determines whether the timer had expired. If the timer has not expired, the process 400 returns to operation 410 to continue monitoring the performance of the system.

However, if decision operation 420 determines that the timer expired and the new SW version did not provide the intended improvement, process 400 proceeds to operation 422 where the new software version is rolled back. Alternatively (not shown), if decision operation 412 and decision operation 414 determine that the new SW version did not cause substantial or significant operational parameter deterioration nor result in substantial or significant operational parameter improvement of the system, operations continues to END without rolling back the new SW.

In one example use, process 400 monitors and records jitter in a location detection (performed by the location engine (LE)) of wireless terminals (WTs) in a specific area. When a new location engine (LE) software version is produced, process 400 may install a new software version and replaces the old version of the SW of the LE and/or the APs that contributed to the jittery location measurement. The new software estimates location of WTs in the affected area and monitors the location jitter associated with the locations of said WTs. An agent on a server, e.g., systems 102a and 102b compares the location jitter before the deployment and after the deployment of the new software version and determines whether the jitter has been reduced by the new software version. If jitter has been reduced then a magnitude of the reduction is assessed. If the jitter improved (was reduced) by more than first threshold, the process 400 may propagate the new location engine software version to additional portions of the multiple instances.

FIG. 5 is a flowchart of a process 500 that may be implemented in one or more of the disclosed embodiments. Process 500 may describe operations that occur in portions of process 400 discussed above. For example, process 500 may be applied in some embodiments to augment processing of decision operations 414 and 416.

Process 500 of FIG. 5 may be performed by hardware processing circuitry. For example, instructions 1224, discussed below, may be stored in one or more hardware memories (e.g. 1204 and/or 1206 discussed below) and configure hardware processing circuitry (e.g. hardware processor 1202 discussed below) to perform one or more of the functions discussed below with respect to process 500.

Some disclosed embodiments may include multiple thresholds and/or criterion, demarcating different levels of improvement realized by newly installed software. Thus, as described by process 500 below, after start operation 501, process 500 moves to operation 502. In operation 502, if one or more operating parameters meet one or more respective first level criterion, process 500 moves from decision operation 502 to operation 506, which propagates a software installation to a first percentage of instances in a set of multiple instances. Decision operation 502 checks for operation parameter values that indicate the roll out of software may be increased by the first percentage. In some aspects, operation 506 rolls the new software out to all remaining instances of the multiple instances.

If the improvement is less than that indicated by the level one criterion of decision operation 502, but meets a second level of criterion evaluated by decision operation 504, process 500 proceeds to operation 508 wherein the operation propagates the new SW version to a second percentage of the remaining instances. In some aspects, the second percentage of operation 508 is less than the first percentage of operation 506. Thus, the better the results, the more quickly and aggressively the disclosed embodiments may roll the new software out to additional instances.

If the monitored operational parameters do not meet either of the improvement criterion of decision operations 502 or 504, then the process 500 proceeds to operation 510 where the new software version is propagated to a third percentage of remaining instances, with the third percentage being less than either the first or second percentages. After completing operation 510, process 500 moves to end operation 512. Note that process 500 is structured such that the second criterion of FIG. 4 has already been met, indicating an improvement in performance has occurred. Note the first and second criterion of FIG. 4 may be separate and distinct from the level one and level two criterion discussed above with respect to FIG. 5.

As one example of an operational parameter evaluated by process 500, a measured location jitter improved by more than second threshold but by less than the first threshold, the system continues to monitor the location jitter for additional period of time before it determines if it should continue expanding the deployment of the new software. However if the location jitter deteriorates (increased), the disclosed embodiments may roll back the new LE software version (or the new AP SW version) and replace it with the old version.

In accordance with yet another example use of the feature, the disclosed embodiments may monitor and record system level experience of wireless terminals (WTs) associated with specific one or more APs. For example, the measured and recorded SLE parameters may include but are not limited to connect time, throughput, coverage, capacity, roaming, success to connect, AP availability, etc.

When a new software version is produced for one or more modules that influence the above-mentioned SLEs (s), for example AP software, the disclosed embodiments, in accordance with instructions defined by the rules, modifies specific one or more software modules. The disclosed embodiments then monitor SLE parameters in accordance with the rules.

The SLEs for WTs in the area governed by the new software version is measured and compared against the old SLE measurements. The monitoring engine 210 for example, compares the SLE before the deployment of the new software version and after the deployment and determines whether the SLE has improved by the new software version and if so by how much.

While the explanation above was described with reference to wireless, and especially Wi-Fi networks, those skilled in the art should recognize that the same system is applicable for any other system including but not limited to wired network, optical network, as well as other automated large-scale software deployments.

Figure 6:
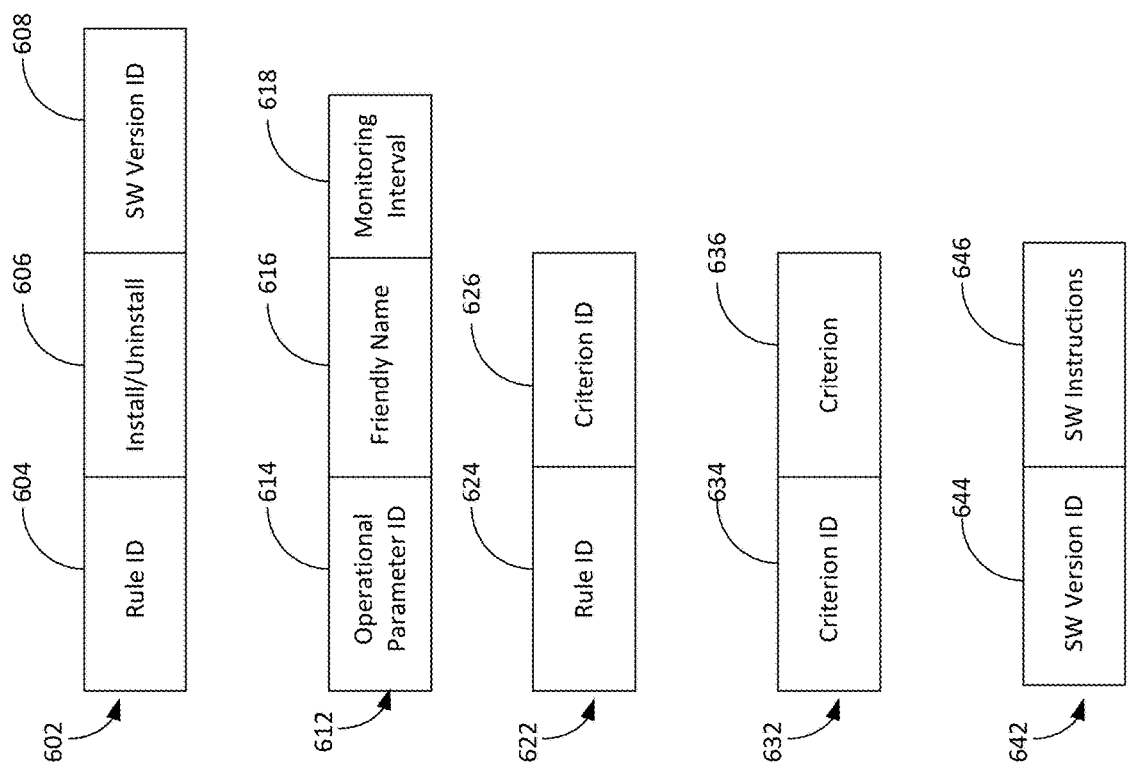
FIG. 6 shows example data structures that are implemented in some of the disclosed embodiments.

FIG. 6 shows example data structures that are implemented in some of the disclosed embodiments. While the data structures of FIG. 6 are shown as relational database tables, one of skill would understand that the disclosed embodiments utilize a variety of data structure organizations, to include traditional memory structures such as linked lists, arrays, trees, graphs, or unstructured data stores, hierarchical data stores, or any other data organization architecture.

FIG. 6 shows a rules table 602, operational parameter table 612, rule-criterion mapping table 622, criterion table 632, and software table 642. The rules table 602 includes a rule identifier field 604, install/uninstall flag field 606, and software version identifier field 608. The rule identifier field 604 uniquely identifies a single rule. The install/uninstall flag field 606 indicates whether the identified rule conditions installation of software or uninstallation/rollback of software. The software version identifier field 608 identifies a software version to which the rule pertains.

The operational parameter table 612 identifies operational parameters that are referenced by a rule in the rules table 602. The operational parameter table 612 includes an operational parameter identifier field 614, a friendly name field 616, and a monitoring interval field 618. The operational parameter identifier field 614 uniquely identifies a single operational parameter. The friendly name field 616 defines a character string that is easily read/identified by humans (e.g. "packet errors per second"). The monitoring interval field 618 defines a periodic monitoring interval for the operational parameter. For example, CPU utilization is monitored at a first interval (e.g. 5 seconds) while network utilization is monitored at a second interval (e.g. 30 seconds) in some embodiments. The interval is assigned, in some embodiments, based on a cost of monitoring the operational parameter. For example, operational parameters that are less expensive, in terms of computing resources, to monitor, are monitored more frequently, in some embodiments, than other operational parameters that consume more compute resources to monitor. Some embodiments assign the interval based on how frequently the operational parameter is subject to change. Slow changing operational parameters are monitored less frequently than more dynamic operational parameters in these embodiments.

The rule criterion mapping table 622 identifies criterion referenced or invoked by a particular rule. The rule identifier field 624 uniquely identifies a particular rule and can be cross referenced with the rule identifier field 604. The criterion id field 626 identifies a criterion evaluated by the rule that identified by the rule identifier field 624. Note that a single rule can include several entries in the rule criterion mapping table 622. The criterion table 632 includes a criterion id field 634 and a criterion field 636. The criterion id field 634 uniquely identifies a criterion and can be cross referenced with criterion id field 626. The criterion field 636 defines the criterion itself. For example, the criterion field 636 includes a relational operator (e.g. =, <, >, <=, >=, !=, etc), and at least two operands. One operand is a constant in some embodiments. One operand is an operational parameter value, identified via the operational parameter identifier such as defined by the operational parameter table 612. A second operand is, in some embodiments, is a historical measurement of the operational parameter value. For example, one operational parameter listed in the operational parameter table can be a root, or source operational parameter, such as, a number of dropped packets within a predetermined time duration. A second operational parameter listed in the operational parameter table can be, for example, a historical average of the number of dropped packets with the predetermined time duration. The criterion defined by the criterion field 636 identifies both of these two operational parameters in the example embodiment. Thus, the criterion can define an operator, and two operands to be evaluated based on the operator. A result of the evaluation indicates whether the criterion is met (e.g. a true value indicates the criterion is met). Additional criterion can be defined to concatenate other criterion, using either an "and" or an "or" operator. Thus, in this type of criterion, an operand is a criterion (identified via criterion ID), and the operator is a logical and or logical or operator. Exclusive or is also supported in some embodiments.

The software table 642 includes a software version identifier field 644 and a software instructions field 646. The software version identifier field 644 stores a version of software. The software instructions field 646 stores data defining instructions that are included in that particular version of software.

Figure 7:
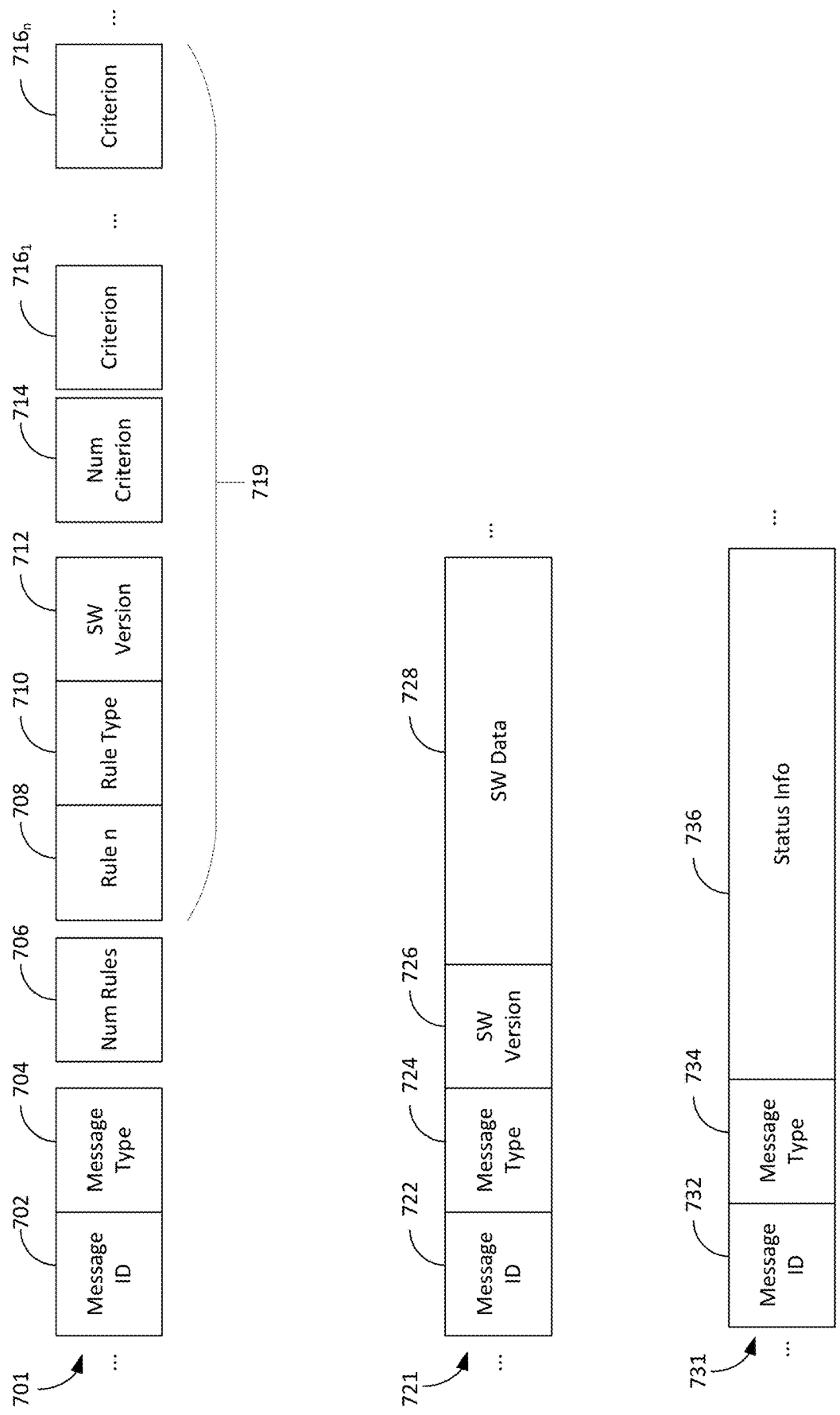
FIG. 7 shows example message portions that are implemented in one or more of the disclosed embodiments.

FIG. 7 shows example message portions that are implemented in one or more of the disclosed embodiments. FIG. 7 shows a rule message portion 701, a software data message portion 721, and a status message portion 731. The rule message portion 701 includes a message identifier field 702, message type field 704, number of rules field 706, a rule identifier field 708, rule type field 710, software version field 712, number of criterion field 714, and one or more criterion fields 716₁ . . . 716ₙ. The message identifier 702 uniquely identifies a message. The message type field 704 indicates the message is a rule message (e.g. via a predetermined identifier). The number of rules field 706 indicates how many rules are defined by the rule message portion 701. The group of message fields 719 repeat once for every rule defined by the number of rules field 706. The rule identifier field 708 identifies a rule included in the rule message portion 701. The rule type field 710 indicates a type of the rule. For example, the type indicates, in some embodiments, whether the rule controls installation or removal of software from a network component device. The software version field 712 indicates a version of software controlled by the rule. In other words, the rule defines installation or removal criterion for the version of software identified by the software version field 712. The number of criterion field 714 defines a number of criterion included in the rule. Following the number of criterion field 714, is one or more criterion fields 716₁ . . . 716ₙ, with the number of criterion fields defined by the number of criterion field 714.

The rule message portion 701 includes a message identifier field 722, message type field 724, software version field 726, and a software data field 728. The message identifier field 722 uniquely identifies the message. The message type field 724 identifies this message as a software data message. The software version field 726 defines a version of software communicated by the rule message portion 701. The software data field 728 defines instructions included in the software itself. For example, the software data field 728 defines an executable file in some embodiments.

The status message portion 731 includes a message identifier field 732, message type field 734, and status information field 736. The message identifier field 732 uniquely identifies he message. The message type field identifies the message as a status message, for example, via a predefined identifier. The status information field 736 defines status information. One or more fields included in the rule message portion 701, or software data message portion 721 are transmitted by the network management module 216 to the agent module 204 in one or more of the disclosed embodiments. One or more of the fields of the status message portion 731 are transmitted by agent module 204 to the network management module 216 in one or more of the disclosed embodiments.

Figure 8:
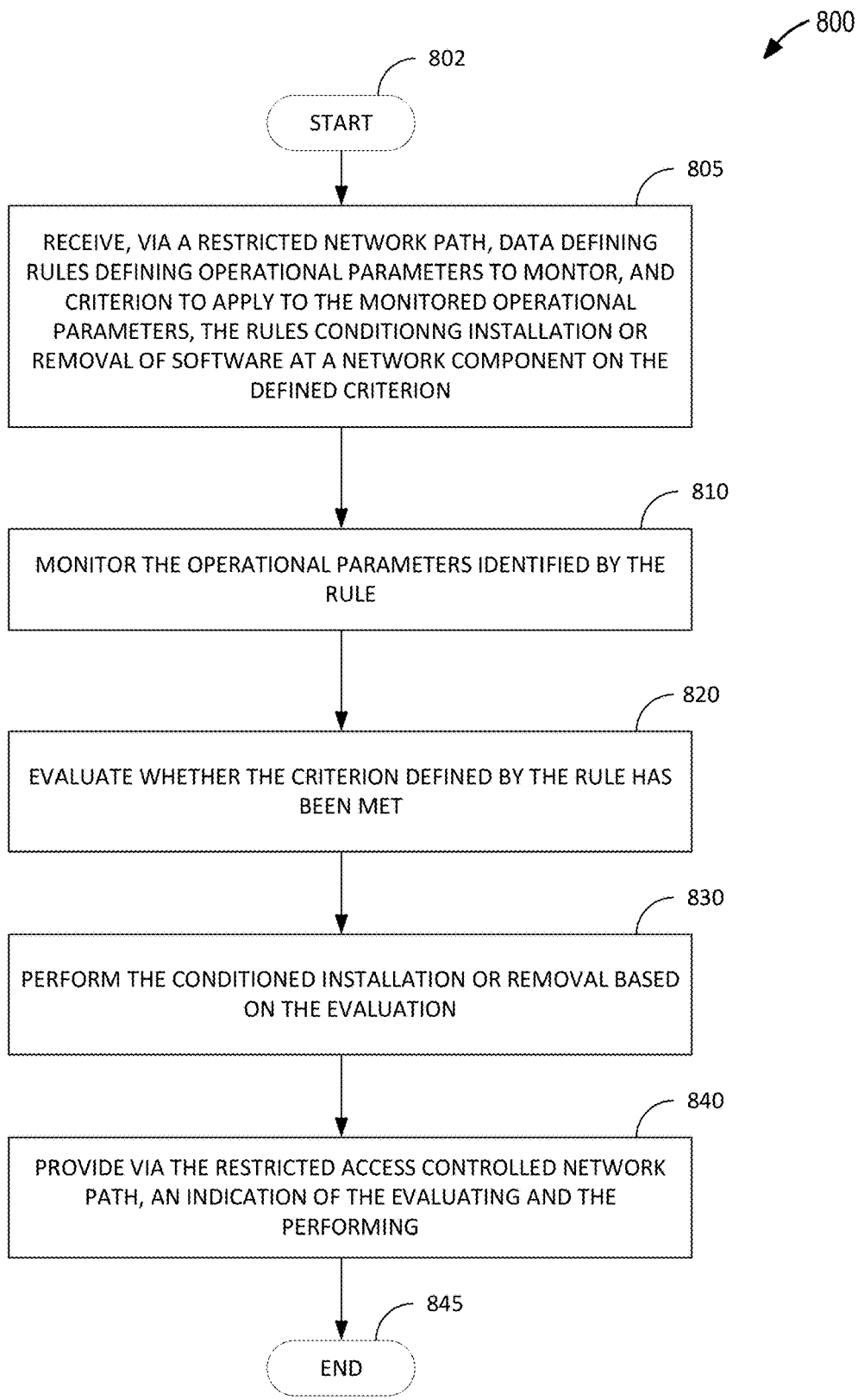
FIG. 8 is a flowchart of a process performed in one or more of the disclosed embodiments.

FIG. 8 is a flowchart of a process performed in one or more of the disclosed embodiments. One or more of the functions discussed below are performed, in some embodiments, by hardware processing circuitry (e.g. 1202). For example, instructions (e.g. 1224) stored in a memory (e.g. 1204, 1206) configure the hardware processing circuitry (e.g. 1202) to perform one or more functions discussed below with respect to FIG. 8 and process 800. In some embodiments, process 800 is performed by a computing system or device executing the agent module 204, discussed above with respect to FIG. 2.

Process 800 begins at start operation 802 and then moves to operation 805. In operation 805, data defining rules is received. In some embodiments, the data is received as part of a rules message, such as a rules message including one or more of the fields discussed above with respect to rule message portion 701. The rules define operational parameters to monitor, and criterion to apply to the monitored operational parameters. The rules condition installation or removal of a software version at a network component, such as an access point (e.g. 202a-d) based on whether the defined criterion are met. For example, as discussed above, the rules define a criterion that includes an operator and two operands. The operands can include one or more of constants or contemporaneous operational parameters, or historical aggregations (averages, medians, normalized values, etc) of operational parameters. Multiple criterion can be chained together via an additional criterion specifying a logical or logical and operator, with the operands specified as operational parameters.

In operation 810, the operational parameters defined by the received rule are monitored. Monitoring is performed periodically in some embodiments. In some embodiments, each operational parameter has an individually assigned monitoring interval. The monitoring of operation 810 is performed by instructions included in the monitoring engine 210 in some embodiments. The monitored operational parameters in various embodiments, include one or more of CPU utilization, memory utilization, I/O channel utilization, network utilization, latency, throughput, or historical averages or medians of any of these operational parameters. The monitoring of operation 810 includes, in some embodiments, storing periodic measurements of the one or more operational parameters in a historical log file. These periodic measurements are used, in some embodiments, to generate historical aggregated representations of these operational parameters, which are relied upon, in some embodiments, to evaluate whether an improvement or degradation in a particular operational parameter (e.g. such as CPU utilization) has occurred after installation of a particular version of software or firmware.

The monitoring of operational parameters is applied to one or more intended target network components. For example, in some embodiments, an agent module 204 maintains, in some embodiments, a list of one or more network components that the agent is responsible for managing, with the managing including management of software installation in accordance with the disclosed embodiments.

Operation 820 evaluates whether the criterion defined by the rule have been met. In other words, operation 820 applies criterion specified by the rule to contemporaneous and/or historical values of the operational parameters monitored in operation 810. The performance of operation 820 results in either a true or false value, at least in some embodiments.

In operation 830, an action specified by the rule is performed if the criterion evaluate to true and is not performed if the criterion evaluate to a false value. Operation 830 performs an installation of software if the criterion is met and the rule is an installation type rule (e.g. as specified by message rule type field 710 and/or install/uninstall flag field 606).

In operation 840, status information is provided, via the restricted access-controlled network path (e.g. via a firewall) . The status information indicates, either directly or indirectly, whether the rule was performed and if so, a result of performing the rule. For example, the status information can indicate that software of a particular version was installed or removed from one or more network components. After operation 840, process 800 moves to end operation 845.

Some embodiments include receiving one or more versions of software, including data defining an executable image for the software. For example, some embodiments include receiving one or more of the fields described above with respect to software data message portion 721. After the software is received, a copy of the executable image, and/or other ancillary files necessary to successfully install the software within the enterprise network (e.g. 201). The stored copy of the software is then used when evaluation indicates the software is to be installed on a network component.

As discussed above, process 800 is performed, in some embodiments, by an agent and/or the agent module 204. Communication between the agent module 204 and the network management module 216 is restricted, in at least some embodiments, by a firewall or other access control device. The restriction prevents the network management module 216 or other devices outside an enterprise network from accessing the network components that are updated by the disclosed embodiments, such as APs 202a-d. The restriction also prevents devices outside the enterprise network from monitoring operational parameters within the enterprise network. This monitoring is used to determine whether a particular version of software is improving performance within the enterprise network or if perhaps the installation should be rolled back, if for example, performance problems are identified after installation of a particular version of software/firmware.

Figure 9:
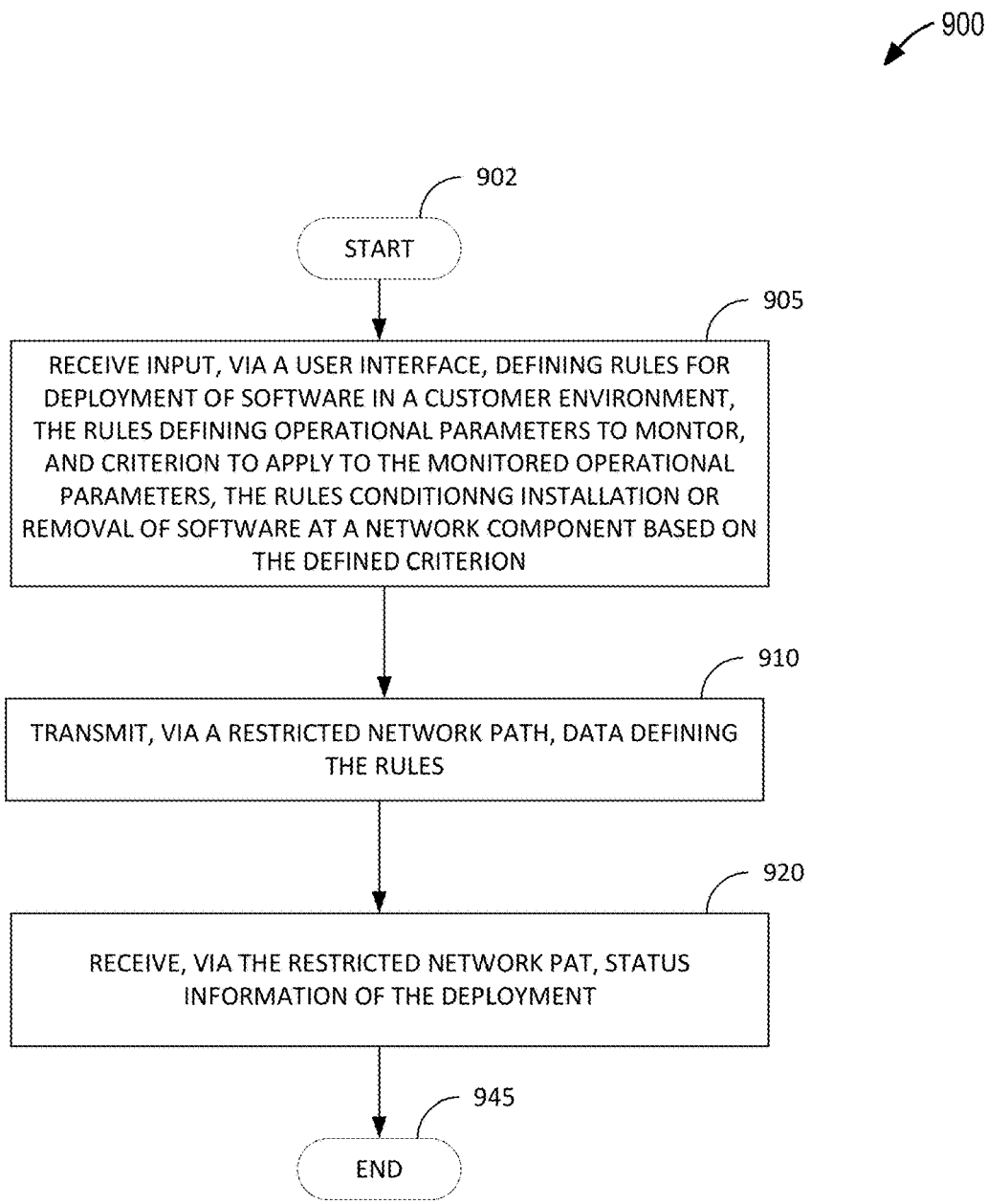
FIG. 9 is a flowchart of a process performed in one or more of the disclosed embodiments.

FIG. 9 is a flowchart of a process performed in one or more of the disclosed embodiments. One or more of the functions discussed below are performed, in some embodiments, by hardware processing circuitry (e.g. 1202). For example, instructions (e.g. 1224) stored in a memory (e.g. 1204, 1206) configure the hardware processing circuitry (e.g. 1202) to perform one or more functions discussed below with respect to FIG. 9 and process 900. In some embodiments, process 900 is performed by a computing system or device executing the agent module 204, discussed above with respect to FIG. 2.

After start operation 902, process 900 moves to operation 905. In operation 905, input is received via a user interface. The input defines rules for deployment of software in a customer environment. The rules define operational parameters to monitor, and criterion to apply to the monitored operational parameters. The rules condition installation or removal of software or firmware at a network component based on the defined criterion.

In operation 910, data defining the rules are transmitted, via an access restricted network path, to an agent running in the customer environment. As discussed above, in some embodiments, the rules editing module 218 and/or a configuration engine 219 communicates data to an agent module (e.g. 204) within a customer environment (e.g. 106 or 201).

In operation 920, status information is received from the agent. In some embodiments, the agent communicates information regarding the deployment. For example, the status information indicates, in some embodiments, one or more of a number of successful deployments of software, a number of failed deployments of software, a number of pending deployments of software. When installation fails, indications of particular deployment rules causing the failure may be provided in some embodiments. For example, if an installation caused an increase in CPU utilization, this is indicated in the status information in some embodiments. After operation 920, process 900 moves to end operation 945.

Figure 10:
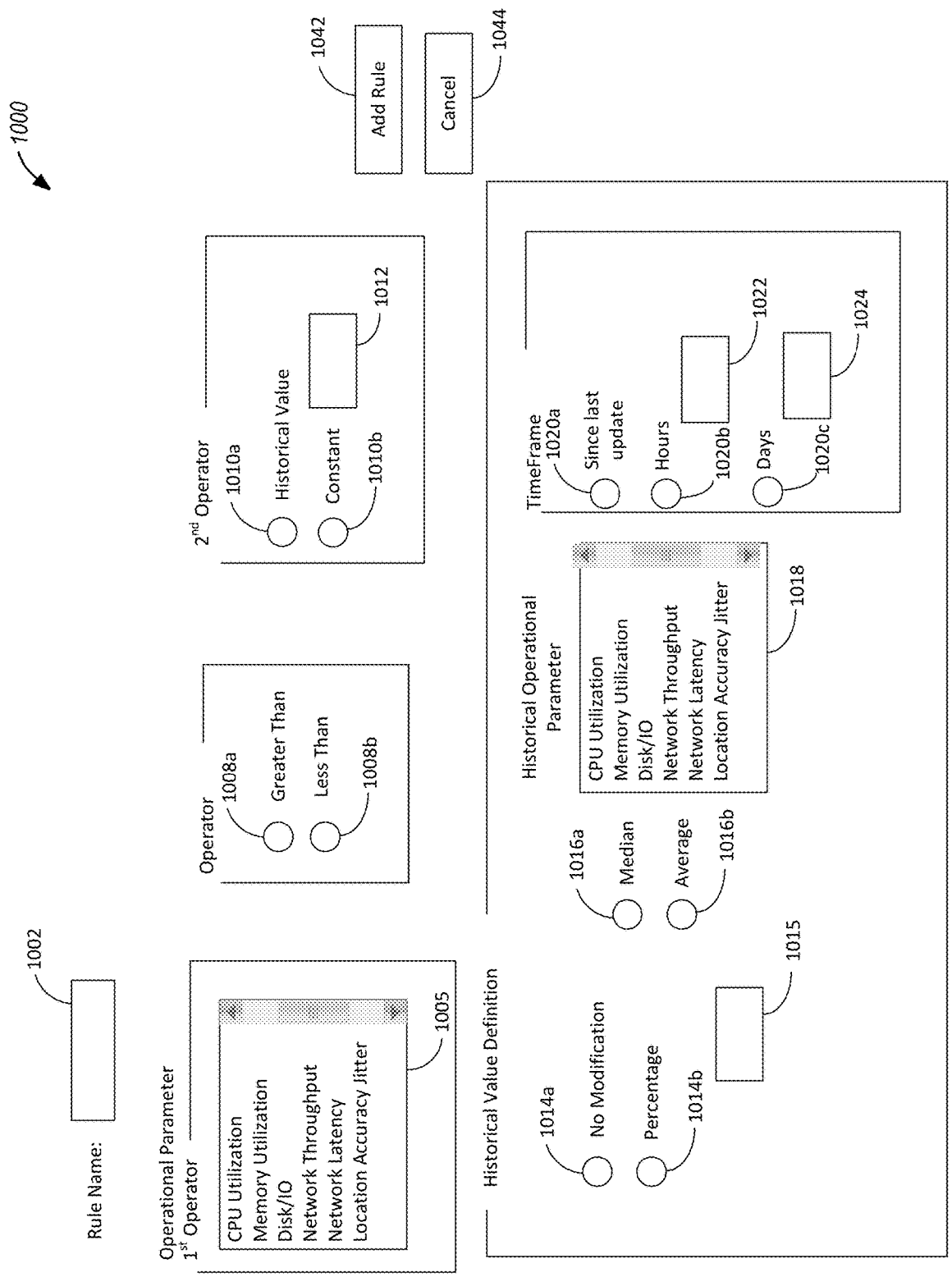
FIG. 10 shows an example user interface for configuring a rule that may be implemented in one or more of the disclosed embodiments.

FIG. 10 shows an example user interface for configuring a rule that may be implemented in one or more of the disclosed embodiments. In some embodiments, the user interface 1000 shown in FIG. 10 is displayed by the rules editing module 218, discussed above with respect to FIG. 2. Thus, in some embodiments, the network management system 112, in some embodiments, runs instructions included in the rules editing module 218 to display the user interface 1000. The user interface may be displayed via web technology, on another device. For example, the user interface 1000 may be provided by a web server running on the network management system 112 and provided by the network management module 216.

The user interface 1000 includes a field 1002 for defining a name of a rule. The user interface also includes an operational parameter list box 1005. The operational parameter list box 1005 provides a list of operational parameters for selection. The selected operational parameter is a first operand for the defined rule (named by field 1002). The user interface 1000 also includes operator selection radio buttons 1008a-b. As shown, the operator selection radio buttons allow a user to configure whether the selected operational parameter (operator) will be considered to be greater than or less than a second operand when the rule is executed.

The user interface 100 also provides for selection of a second operator via radio buttons 1010a-b. The second operator may be a constant, specified via radio button 1010b and edit box 1012. Alternatively, the second operator can be set to be a historical value via selection of radio button 1010a.

The user interface 1000 also provides for definition of the second operand when a historical value is selected via radio button 1010a. First, the user interface 1000 provides for comparison to the historical value itself or a percentage of the historical value via radio buttons 1014a-b. Thus, for example, a rule can indicate that latency measured after installation of a software update should be less than 105% of a prior latency measurement. A percentage value is selected via radio button 1014b and edit box 1015.

The user interface 1000 is also configured to provide a selection of a type of historical parameter value to use as a second operator. Radio buttons 1016a-b also selection of a median value or an average value of the historical parameter. Edit box 1018 also selection of the historical parameter. Typically, the historical parameter selects in edit box 1018 will be equivalent to the operational parameter selected in 1005, and may be set to such a default value in some embodiments. User interface 1000 is also configured to provide a selection of a timeframe of historical data considered by the rule. For example, the radio buttons 1020a-c provide for selection of a timeframe since a previous software/firmware update via radio button 1020a, a number of hours via radio button 1020b and edit box 1022, or a number of days via radio button 1020c and edit box 1024. Add rule button 1042 provides for saving the rule defined by the user interface 1000 while button 1044 exits the user interface 1000 without saving the rule data.

Figure 11:
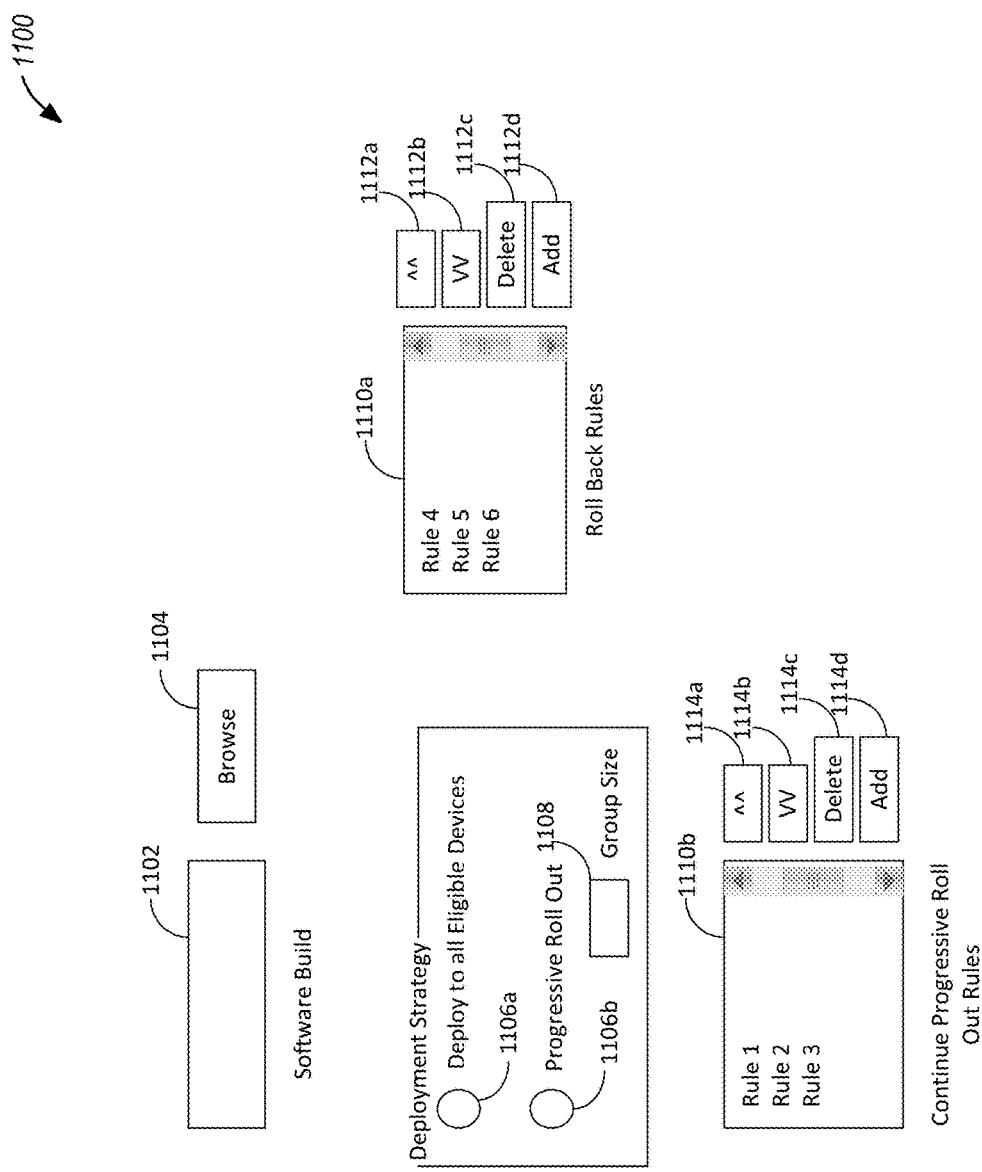
FIG. 11 is an example user interface that is implemented in one or more of the disclosed embodiments.

FIG. 11 is an example user interface 1100 that is implemented in one or more of the disclosed embodiments. User interface 1100 includes a field 1102 to identify a software or firmware installation file. A file may be selected via a browse button 1104. The user interface 1100 also for selection of a deployment strategy via radio buttons 1106a-b. Radio button 1106a sets a deployment to all eligible devices, while selection of radio button 1106b provides for a progressive rollout. Progressive rollouts consist of at least two stages. Moving from a first stage of the stages to a next stage is controlled by a progressive rollout rule set defined via the rule set box 1110b. Progressive rollouts are performed in groups. The group size is set via group size edit box 1108. The software build defined by field 1102 is deployed unconditionally to each device in a single group. The progressive rollout rule set is then evaluated to determine if the software/firmware build is installed to a next stage (second group of devices). The roll back rule set defined by roll back rule set box 1110a determines whether the installation is rolled back to a previous version of the software build. In some embodiments, each of the rules sets are evaluated from top to bottom, until either a rule is determined to be true, or the bottom is reached. In some embodiments, if a rule defined in either roll back rule set box 1110a or rule set box 1110b evaluates to true, the action occurs. Thus, in the roll back rules defined by roll back rule set box 1110a, if any rule listed in roll back rule set box 1110a evaluates to true, the roll back is performed. No roll back is performed if all the rules are executed and none evaluate to a true value. In some embodiments, the rules defined in the roll back rule set box 1110a are evaluated periodically. The duration of the period is configurable in some embodiments (not shown).

Selection of one of the add buttons 1112d or 1114d may display the user interface 1000 in some embodiments.

Figure 12:
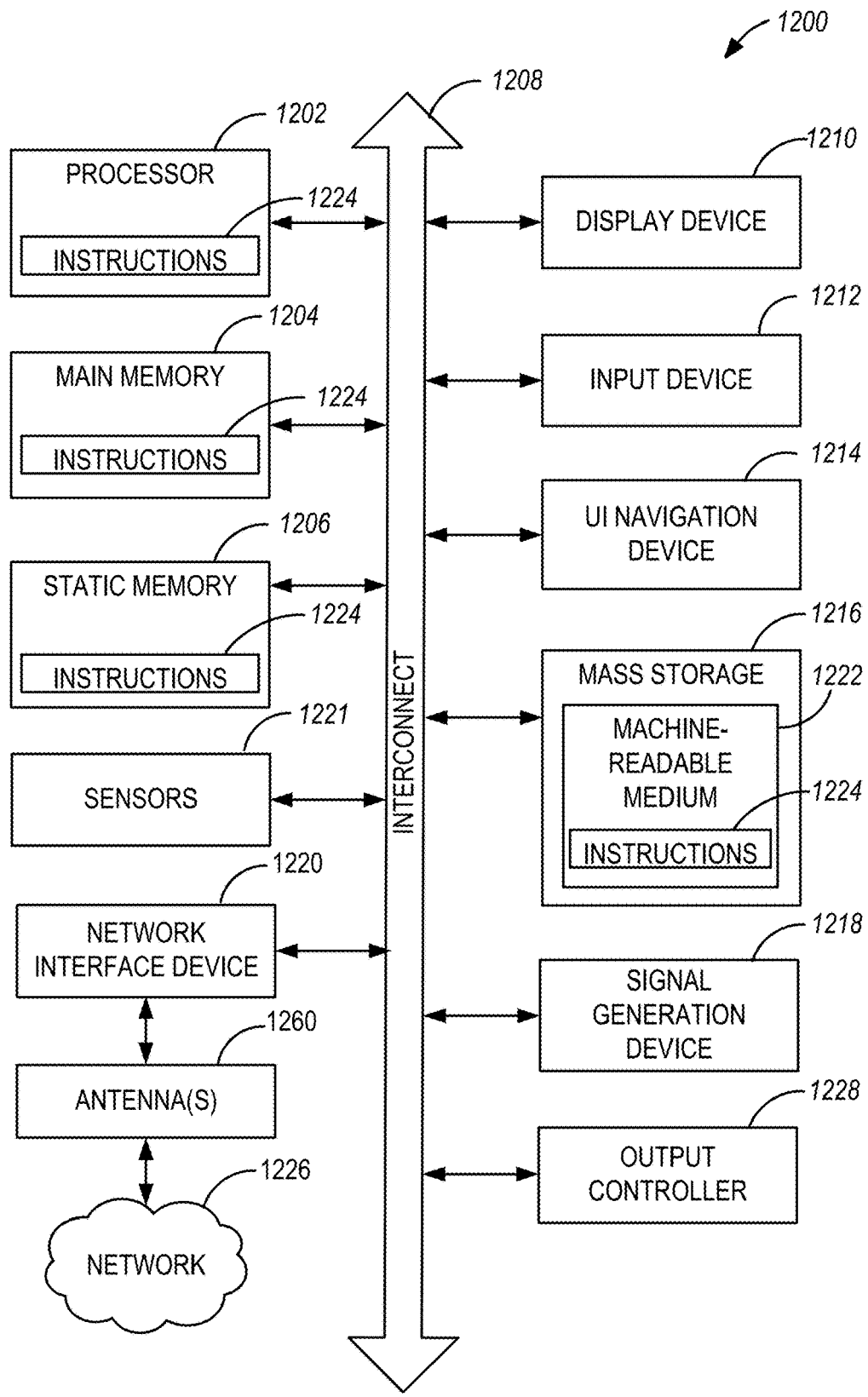
FIG. 12 illustrates a block diagram of an example machine upon which any one or more of the techniques (e.g., methodologies) discussed herein may perform.

FIG. 12 illustrates a block diagram of an example machine 1200 upon which any one or more of the techniques (e.g., methodologies) discussed herein may perform. Machine (e.g., computer system) 1200 may include a hardware processor 1202 (e.g., a central processing unit (CPU), a graphics processing unit (GPU), a hardware processor core, or any combination thereof), a main memory 1204 and a static memory 1206, some or all of which may communicate with each other via an interlink (e.g., bus) 1208.

Specific examples of main memory 1204 include Random Access Memory (RAM), and semiconductor memory devices, which may include, in some embodiments, storage locations in semiconductors such as registers. Specific examples of static memory 1206 include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; RAM; and CD-ROM and DVD-ROM disks.

The machine 1200 may further include a display device 1210, an input device 1212 (e.g., a keyboard), and a user interface (UI) navigation device 1214 (e.g., a mouse). In an example, the display device 1210, input device 1212 and UI navigation device 1214 may be a touch screen display. The machine 1200 may additionally include a mass storage (e.g., drive unit) 1216, a signal generation device 1218 (e.g., a speaker), a network interface device 1220, and one or more sensors 1221, such as a global positioning system (GPS) sensor, compass, accelerometer, or other sensor. The machine 1200 may include an output controller 1228, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.). In some embodiments the hardware processor 1202 and/or instructions 1224 may comprise processing circuitry and/or transceiver circuitry.

The storage device 1216 may include a machine readable medium 1222 on which is stored one or more sets of data structures or instructions 1224 (e.g., software) embodying or utilized by any one or more of the techniques or functions described herein. The instructions 1224 may also reside, completely or at least partially, within the main memory 1204, within static memory 1206, or within the hardware processor 1202 during execution thereof by the machine 1200. In an example, one or any combination of the hardware processor 1202, the main memory 1204, the static memory 1206, or the storage device 1216 may constitute machine readable media.

Specific examples of machine-readable media may include: non-volatile memory, such as semiconductor memory devices (e.g., EPROM or EEPROM) and flash memory devices; magnetic disks, such as internal hard disks and removable disks; magneto-optical disks; RAM; and CD-ROM and DVD-ROM disks.

While the machine readable medium 1222 is illustrated as a single medium, the term "machine readable medium" may include a single medium or multiple media (e.g., a centralized or distributed database, and/or associated caches and servers) configured to store the one or more instructions 1224.

An apparatus of the machine 1200 may be one or more of a hardware processor 1202 (e.g., a central processing unit (CPU), a graphics processing unit (GPU), a hardware processor core, or any combination thereof), a main memory 1204 and a static memory 1206, sensors 1221, network interface device 1220, antennas 1260, a display device 1210, an input device 1212, a UI navigation device 1214, a mass storage 1216, instructions 1224, a signal generation device 1218, and an output controller 1228. The apparatus may be configured to perform one or more of the methods and/or operations disclosed herein. The apparatus may be intended as a component of the machine 1200 to perform one or more of the methods and/or operations disclosed herein, and/or to perform a portion of one or more of the methods and/or operations disclosed herein. In some embodiments, the apparatus may include a pin or other means to receive power. In some embodiments, the apparatus may include power conditioning hardware.

The term "machine readable medium" may include any medium that is capable of storing, encoding, or carrying instructions for execution by the machine 1200 and that cause the machine 1200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 1224 may further be transmitted or received over a communications network 1226 using a transmission medium via the network interface device 1220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others.

In an example, the network interface device 1220 may include one or more physical jacks (e.g., Ethernet, coaxial, or phone jacks) or one or more antennas to connect to the communications network 1226. In an example, the network interface device 1220 may include one or more antennas 1260 to wirelessly communicate using at least one of single-input multiple-output (SIMO), multiple-input multiple-output (MIMO), or multiple-input single-output (MISO) techniques. In some examples, the network interface device 1220 may wirelessly communicate using Multiple User MIMO techniques. The term "transmission medium" shall be taken to include any intangible medium that is capable of storing, encoding or carrying instructions for execution by the machine 1200, and includes digital or analog communications signals or other intangible medium to facilitate communication of such software.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Example 1 is a method, comprising: receiving, by a first device, via a restricted access-controlled network path between the first device and a second device, a rule identifying a computing system condition and a criterion referencing the computing system condition; monitoring, by the first device, the computing system condition; determining, by the first device and based on the monitoring, that the criterion is met; installing or removing software at a network component based on the determining; and providing, by the first device to the second device, via the restricted access-controlled network path, an indication of the installation or removal.

In Example 2, the subject matter of Example 1 optionally includes receiving, from the second device, via the restricted access-controlled network path, a copy of the software; and staging the copy of the software at the first device, wherein the installation or removal further comprises installing the software to a first network component based on the staged copy in response to the criterion being met.

In Example 3, the subject matter of Example 2 optionally includes wherein the restricted access-controlled network path is controlled by a firewall, and the firewall is configured to block access to the first network component by the second device.

In Example 4, the subject matter of Example 3 optionally includes wherein the firewall restricts access to an enterprise network, and the first device monitors the computing system conditions of the enterprise network, wherein the second device is prevented from monitoring the computing system conditions by the firewall.

In Example 5, the subject matter of any one or more of Examples 3-4 optionally include wherein the firewall is further configured to block access to the monitored computing system conditions by the second device.

In Example 6, the subject matter of any one or more of Examples 1-5 optionally include wherein the monitored computing system conditions include one or more of CPU utilization, memory utilization, I/O channel utilization, or network utilization.

In Example 7, the subject matter of any one or more of Examples 1-6 optionally include wherein the criterion defines a relationship between a contemporaneous measurement of a computing system condition and a historical measurement of the computing system condition.

In Example 8, the subject matter of Example 7 optionally includes periodically monitoring a computing system condition and storing indications of the computing system condition based on the periodic monitoring, generating the historical measurement of the computing system condition based on a plurality of stored indications of the computing system condition.

Example 9 is a system, comprising: hardware processing circuitry; one or more hardware memories storing instructions that configure the hardware processing circuitry to perform operations comprising: receiving, by a first device, via a restricted access-controlled network path between the first device and a second device, a rule identifying a computing system condition and a criterion referencing the computing system condition; monitoring, by the first device, the computing system condition; determining, by the first device, that the criterion is met; installing or removing software on a network component based on the determining; and providing, by the first device to the second device, via the restricted access-controlled network path, an indication of the installing or removing.

In Example 10, the subject matter of Example 9 optionally includes the operations further comprising receiving, from the second device, via the restricted access-controlled network path, a copy of the software; and staging the copy of the software at the first device, wherein the performing of the conditioned installation or removal further comprising installing the software to a first network component based on the staged copy in response to the evaluating.

In Example 11, the subject matter of Example 10 optionally includes wherein the restricted access-controlled network path is controlled by a firewall, and the firewall is configured to block access to the first network component by the second device.

In Example 12, the subject matter of Example 11 optionally includes wherein the firewall restricts access to an enterprise network, and the first device monitors the computing system conditions of the enterprise network, wherein the second device is prevented from monitoring the computing system conditions by the firewall.

In Example 13, the subject matter of any one or more of Examples 11-12 optionally include wherein the firewall is further configured to block access to the monitored computing system conditions by the second device.

In Example 14, the subject matter of any one or more of Examples 9-13 optionally include wherein the monitored computing system conditions include one or more of CPU utilization, memory utilization, I/O channel utilization, or network utilization.

In Example 15, the subject matter of any one or more of Examples 9-14 optionally include wherein the criterion defines a relationship between a contemporaneous measurement of a computing system condition and a historical measurement of the computing system condition.

In Example 16, the subject matter of Example 15 optionally includes the operations further comprising periodically monitoring a computing system condition and storing indications of the computing system condition based on the periodic monitoring, generating the historical measurement of the computing system condition based on a plurality of stored indications of the computing system condition.

Example 17 is a non-transitory computer readable storage medium comprising instructions that when executed configure hardware processing circuitry to perform operations comprising: receiving, by a first device, via a restricted access-controlled network path between the first device and a second device, a rule defining a computing system condition and a criterion referencing the computing system condition; monitoring, by the first device, the computing system condition identified by the rule; determining, by the first device, that the criterion is met; installing or removing software on a first network component based on the determining; and providing, by the first device to the second device, via the restricted access-controlled network path, an indication of the installing or removing.

In Example 18, the subject matter of Example 17 optionally includes receiving, from the second device, via the restricted access-controlled network path, a copy of the software; and staging the copy of the software at the first device, wherein the installation or removal comprises installing the software to the first network component based on the staged copy in response to the evaluating.

In Example 19, the subject matter of Example 18 optionally includes wherein the restricted access-controlled network path is controlled by a firewall, and the firewall is configured to block access to the first network component by the second device.

In Example 20, the subject matter of Example 19 optionally includes wherein the firewall restricts access to an enterprise network, and the first device monitors the computing system conditions of the enterprise network, wherein the second device is prevented from monitoring the computing system conditions by the firewall.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; flash memory, etc.

We claim:
1. A method, comprising:
receiving, by a first computing device of an enterprise network executing a network management agent, the first computing device configured to communicate with a second computing device of a network management server outside of the enterprise network via a restricted access-controlled network path, a rule identifying one or more operational parameters to be monitored by the network management agent and, for each of the one or more operational parameters, a criterion indicative of an improvement in performance of the enterprise network;
installing software on a first subset of network devices on the enterprise network;
monitoring, by the first computing device, the one or more operational parameters of the first subset of network devices after installation of the software;
in response to determining, by the first computing device, that the criterion for at least one of the one or more operational parameters is met, installing the software on a second subset of network devices on the enterprise network;
and
providing, by the first computing device to the second computing device, via the restricted access-controlled network path, an indication of the installation of the software on the first subset of network devices or on the second subset of network devices.

2. The method of claim 1, further comprising receiving, from the second computing device, via the restricted access-controlled network path, a copy of the software; and staging the copy of the software at the first computing device, wherein installing software further comprises installing the software to the first subset of network devices based on the staged copy in response to the criterion for at least one of the operational parameters being met.

3. The method of claim 2, wherein the restricted access-controlled network path is controlled by a firewall, and the firewall is configured to block access to the first subset of network devices by the second computing device.

4. The method of claim 2, wherein a firewall restricts access to the enterprise network, and wherein the second computing device is prevented from monitoring the one or more operational parameters of the enterprise network by the firewall.

5. The method of claim 4, wherein the firewall is further configured to block access to the monitored one or more operational parameters by the second computing device.

6. The method of claim 1, wherein the one or more operational parameters include one or more of CPU utilization, memory utilization, I/O channel utilization, or network utilization.

7. The method of claim 1, wherein the criterion defines a relationship between a contemporaneous measurement of the operational parameter and a historical measurement of the operational parameter.

8. The method of claim 7, further comprising, for each of the one or more operational parameters:
periodically monitoring the operational parameter;
storing indications of the operational parameter based on the periodic monitoring; and
generating the historical measurement of the operational parameter based on a plurality of stored indications of the operational parameter.

9. The method of claim 1, wherein the criterion indicative of an improvement in performance of the enterprise network is a first criterion, the rule further defining a second criterion indicative of a degradation in performance of the enterprise network, the method further comprising:

in response to determining, by the first computing device, that the second criterion for at least one of the one or more operational parameters is met, rolling back installation of the software on the first subset of network devices.

10. A system, comprising:

hardware processing circuitry including a first computing device of an enterprise network executing a network management agent, the first computing device configured to communicate with a second computing device of a network management server outside of the enterprise network via a restricted access-controlled network path;

one or more hardware memories storing instructions that configure the hardware processing circuitry to perform operations comprising:

receiving, by the first computing device, via the restricted access-controlled network path, a rule identifying one or more operational parameters to be monitored by the network management agent, and for each of the one or more operational parameters, a criterion indicative of an improvement in performance of the enterprise network;

installing software on a first subset of network devices on the enterprise network;

monitoring, by the first computing device, the one or more operational parameters of the first subset of network devices after installation of the software;

in response to determining, by the first computing device, that the criterion for at least one of the one or more operational parameters is met, installing the software on a second subset of network devices on the enterprise network;

and providing, by the first computing device to the second computing device, via the restricted access-controlled network path, an indication of the installing of the software on the first subset of network devices or the second subset of network devices.

11. The system of claim 10, the operations further comprising:

receiving, from the second computing device, via the restricted access-controlled network path, a copy of the software;

staging the copy of the software at the first computing device; and installing the software to the first subset of network devices based on the staged copy.

12. The system of claim 11, wherein the restricted access-controlled network path is controlled by a firewall, and the firewall is configured to block access to the first subset of network devices by the second computing device.

13. The system of claim 11, wherein a firewall restricts access to the enterprise network, and the first computing device monitors the one or more operational parameters of the enterprise network, wherein the second computing device is prevented from monitoring the one or more operational parameters by the firewall.

14. The system of claim 13, wherein the firewall is further configured to block access to the monitored one or more operational parameters by the second computing device.

15. The system of claim 10, wherein the one or more operational parameters include one or more of CPU utilization, memory utilization, I/O channel utilization, or network utilization.

16. The system of claim 10, wherein, for each of the one or more operational parameters, the criterion defines a relationship between a contemporaneous measurement of the operational parameter and a historical measurement of the operational parameter.

17. The system of claim 16, the operations further comprising, for each of the one or more operational parameters:

periodically monitoring the operational parameter;

storing indications of the operational parameter based on the periodic monitoring; and generating the historical measurement of the operational parameter based on a plurality of stored indications of the operational parameter.

18. A non-transitory computer readable storage medium comprising instructions that when executed configure hardware processing circuitry to perform operations comprising:

receiving, by a first computing device of an enterprise network executing a network management agent, the first computing device configured to communicate with a second computing device of a network management server outside of the enterprise network via a restricted access-controlled network path, a rule defining one or more operational parameters of the enterprise network, and, for each of the one or more operational parameters, a criterion indicative of an improvement in performance of the enterprise network;

installing software on a first subset of network devices on the enterprise network;

monitoring, by the first computing device, the one or more operational parameters of the first subset of network devices after installation of the software;

in response to determining, by the first computing device, that the criterion for at least one of the one or more operational parameters is met, installing the software on a second subset of network devices on the enterprise network;

and providing, by the first computing device to the second computing device, via the restricted access-controlled network path, an indication of the installation of the software on the first subset of network devices or on the second subset of network devices.

19. The non-transitory computer readable storage medium of claim 18, further comprising:

receiving, from the second computing device, via the restricted access-controlled network path, a copy of the software;

staging the copy of the software at the first computing device; and installing the software to the first subset of network devices based on the staged copy.

20. The non-transitory computer readable storage medium of claim 19, wherein the restricted access-controlled network path is controlled by a firewall, and the firewall is configured to block access to the first subset of network devices by the second computing device.

21. The non-transitory computer readable storage medium of claim 20, wherein a firewall restricts access to the enterprise network, and the first computing device monitors the one or more operational parameters of the enterprise network, wherein the second computing device is prevented from monitoring the one or more operational parameters by the firewall.

* * * * *